United States Patent
Bizouard et al.

(10) Patent No.: US 12,552,276 B2
(45) Date of Patent: Feb. 17, 2026

(54) ELECTRIC VEHICLE CHARGER CABLE MANAGEMENT BASED ON SENSOR DATA

(71) Applicant: ADDÉNERGIE TECHNOLOGIES INC., Québec (CA)

(72) Inventors: Jean Gérard Bizouard, Québec (CA); François Perreault, Lévis (CA)

(73) Assignee: ADDÉNERGIE TECHNOLOGIES INC., Québec (CA)

( * ) Notice: Subject to any disclaimer, the term of this patent is extended or adjusted under 35 U.S.C. 154(b) by 592 days.

(21) Appl. No.: 18/159,954

(22) Filed: Jan. 26, 2023

(65) Prior Publication Data
US 2024/0253491 A1  Aug. 1, 2024

(51) Int. Cl.
| | | |
|---|---|---|
| B60L 53/30 | (2019.01) | |
| B60L 53/18 | (2019.01) | |
| B65H 59/38 | (2006.01) | |
| B65H 75/44 | (2006.01) | |
| G01L 5/10 | (2020.01) | |
| H02G 11/00 | (2006.01) | |
| H02J 7/00 | (2006.01) | |

(52) U.S. Cl.
CPC .............. B60L 53/30 (2019.02); B60L 53/18 (2019.02); B65H 59/385 (2013.01); B65H 59/387 (2013.01); B65H 75/4484 (2013.01); G01L 5/10 (2013.01); H02G 11/006 (2013.01); H02J 7/0045 (2013.01); H02J 7/0047 (2013.01)

(58) Field of Classification Search
CPC ........ B60L 53/30; B60L 53/18; H02J 7/0045; H02J 7/0047
USPC ....................................................... 320/109
See application file for complete search history.

(56) References Cited

U.S. PATENT DOCUMENTS

| | | | |
|---|---|---|---|
| 9,902,276 B2 * | 2/2018 | Bianco | .................... B60L 53/31 |
| 2012/0048983 A1 | 3/2012 | Bianco et al. | |
| 2016/0207408 A1 | 7/2016 | Bianco et al. | |

(Continued)

FOREIGN PATENT DOCUMENTS

| | | |
|---|---|---|
| DE | 102011051052 A1 | 12/2012 |
| DE | 102012216335 A1 | 3/2014 |

(Continued)

OTHER PUBLICATIONS

PCT International Searching Authority, International Search Report and Written Opinion relating to International application No. PCT/CA2023/050100 dated Sep. 12, 2023.

*Primary Examiner* — Nathaniel R Pelton
(74) *Attorney, Agent, or Firm* — Rowand LLP

(57) ABSTRACT

There may be provided a cable management system for an electric vehicle charger. The cable management system may include a mechanical wire coupled to a charging cable associated with the electric vehicle charger and an enclosure. The cable management system may include a wire tension sensor engaging the mechanical wire. The wire tension sensor may generate a sensor output based on a force applied to the mechanical wire. The wire retractor may be configured to retract the mechanical wire into the enclosure and extend the mechanical wire from the enclosure. The cable management system may include a controller coupled to the wire tension sensor. The controller may be configured with instructions which, when executed, cause the controller to control the wire retractor based on an amount of force applied to the mechanical wire.

20 Claims, 24 Drawing Sheets

(56) References Cited

U.S. PATENT DOCUMENTS

2016/0272074 A1 9/2016 McGrath et al.
2019/0118671 A1* 4/2019 Helnerus ................. B60L 53/16

FOREIGN PATENT DOCUMENTS

| EP | 3822110 A1 | 5/2021 |
|----|------------|--------|
| WO | 2017222557 A1 | 12/2017 |
| WO | WO 2017/222557 | * 12/2017 |

* cited by examiner

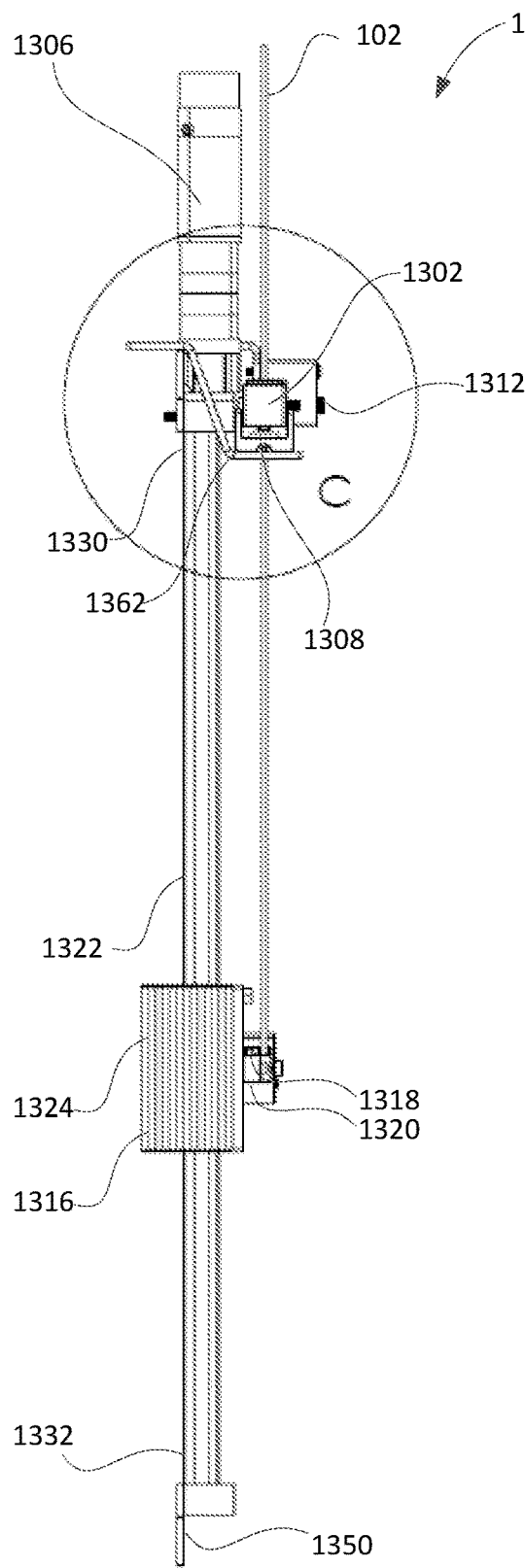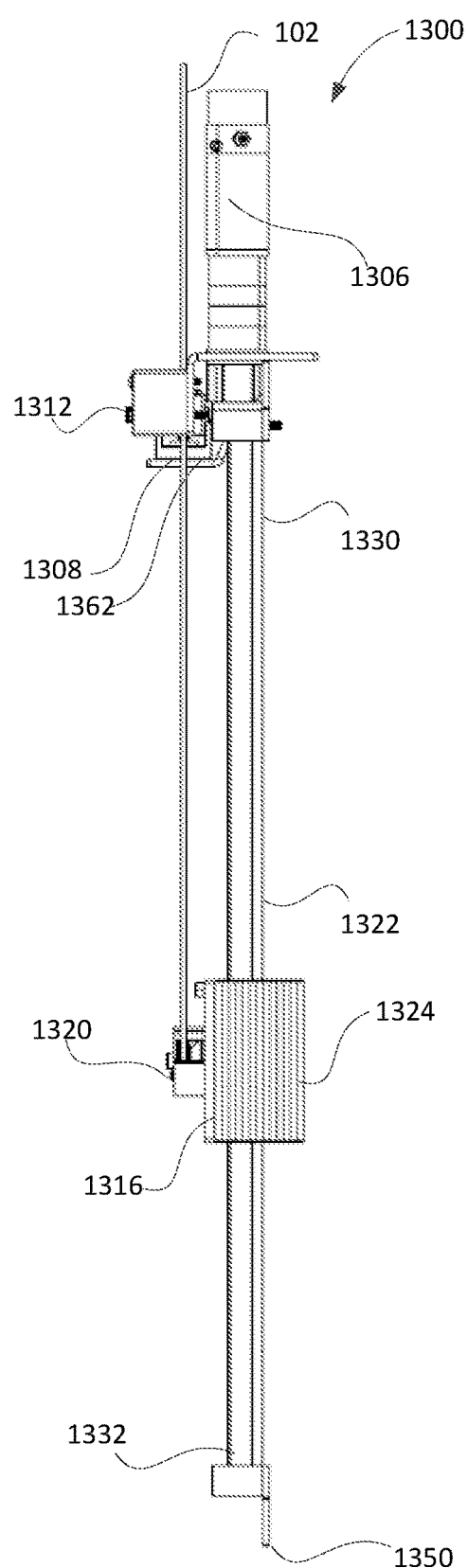
FIG. 15     FIG. 16

ELECTRIC VEHICLE CHARGER CABLE MANAGEMENT BASED ON SENSOR DATA

FIELD

This application relates to electric vehicle charging stations. More particularly, one or more embodiments pertain to cable management systems (CMS) for electrical vehicle charging stations.

BACKGROUND

An electric vehicle (EV) charging station is an element of infrastructure that supplies direct current (DC) or alternating current (AC) electric energy for the recharging of electric vehicles, such as plug-in battery electric vehicles, including electric cars, trucks, buses, and other vehicles including high and low range electric vehicles and plug-in hybrids.

Electric vehicle users often wish to rapidly charge such vehicles and, in order to accommodate such users, some EV charging stations are high-voltage charging stations which deliver high power to the electrical vehicle during charging. For example, some chargers, which are often referred to as level 3 or Direct Current Fast Chargers (DCFC) may deliver up to 350 kW of power at around 400 VDC. Even faster charging is possible with yet higher voltage and power capabilities.

One challenge with electric vehicle chargers, which is most acute with high-speed chargers, is cable management. As voltage and power requirements of chargers increase, the size of cabling required to connect the EV charger to the EV also increases. Some users may find the cabling difficult or impossible to use and the cabling may be problematic for those with disabilities. It may be difficult to improve charging capabilities for some chargers while ensuring accessibility and compliance with requirements such as the Americans with Disabilities Act.

Further, charging cables for EV chargers that are simply left in an extended position on the ground may present hazards. For example, such charging cables may be a tripping hazard and/or such charging cables may be an electrical safety hazard. For example, when lying on the ground a cable may be damaged by a vehicle. In some climates, there is also a possibility that charging cables that are left on the ground in place after charging may be covered by snow or may freeze to the ground or they may be hit or caught by a snow plow.

Accordingly, there is a need for improved cable management systems for EV charging stations.

BRIEF DESCRIPTION OF THE DRAWINGS

Embodiments are described in detail below, with reference to the following drawings:

FIG. 15 is a left side elevational view of the cable management system of FIG. 13;

FIG. 16 is a right side elevational view of the cable management system of FIG. 13;

Like reference numerals are used in the drawings to denote like elements and features.

DETAILED DESCRIPTION OF EXAMPLE EMBODIMENTS

Figure 1:
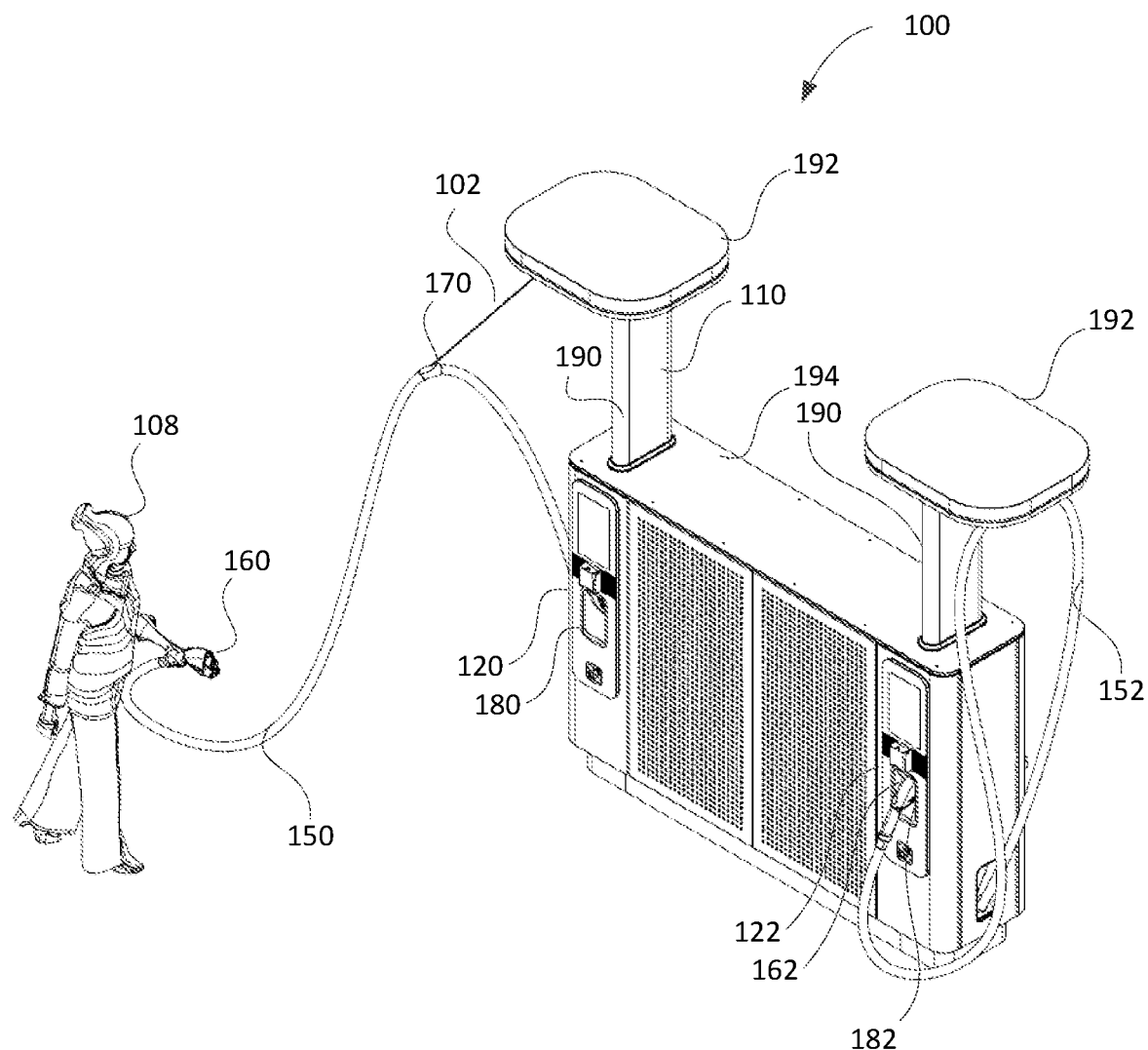
FIG. 1 is a perspective view of an electric vehicle (EV) charging station in accordance with an example of the present application.

According to the subject-matter of the present application, there may be provided a cable management system for an electric vehicle charger. The cable management system may include a mechanical wire coupled to a charging cable associated with the electric vehicle charger and an enclosure. The cable management system may include a wire tension sensor engaging the mechanical wire. The wire tension sensor may generate a sensor output based on a force applied to the mechanical wire. The wire retractor may be configured to retract the mechanical wire into the enclosure and extend the mechanical wire from the enclosure. The cable management system may include a controller coupled to the wire tension sensor. The controller may be configured with instructions which, when executed, cause the controller to control the wire retractor based on an amount of force applied to the mechanical wire.

In at least some implementations, the instructions may cause the wire retractor to extend the mechanical wire in response to detecting a pulling force applied to the mechanical wire.

In at least some implementations, the instructions may cause the wire retractor to extend the mechanical wire in response to detecting a load that is determined to be at least a threshold amount greater than a resting state load determined after a last full retraction of the mechanical wire.

In at least some implementations, the instructions may cause the wire retractor to extend the mechanical wire at a rate that depends on an amount of the force applied to the mechanical wire.

In at least some implementations, the instructions may cause the wire retractor to extend the mechanical wire at a first rate when a first amount of force is applied to the mechanical wire and at a different second rate when a second amount of force is applied to the mechanical wire, the second amount of force being different than the first amount of force.

In at least some implementations, the instructions may cause the controller to obtain sensor data from the wire tension sensor. Controlling the wire retractor based on an amount of force applied to the mechanical wire may include: comparing the sensor data to a threshold; and sending a control signal to the wire retractor based on a result of the comparison.

In at least some implementations, the instructions may cause the controller to send the control signal to extend the mechanical wire at a first speed when a load represented by the sensor data exceeds a first threshold.

In at least some implementations, the instructions may cause the controller to send the control signal to extend the mechanical wire at a second speed when a load represented by the sensor data exceeds a second threshold.

In at least some implementations, the cable management system may further include an extension state sensor coupled to the controller. The instructions may further cause the controller to: detect, based on sensor data from an extension state sensor, that the wire retractor is in a particular state of extension; and in response to detecting that the wire retractor is in the particular state of extension, reducing a speed of the wire retractor to slow extension of the mechanical wire.

In at least some implementations, a retraction state sensor may be coupled to the controller. The instructions may further cause the controller to: detect, based on sensor data from a retraction state sensor, that the wire retractor is in a particular state of retraction; and in response to detecting that the wire retractor is in the particular state of extension, reducing a speed of the wire retractor to slow retraction of the mechanical wire.

In at least some implementations, the controller may be coupled to an interface of an electric vehicle charger. The controller may be configured to: receive charger state data; and control the wire retractor based on the charger state data.

In at least some implementations, controlling the wire retractor based on the charger state data may include preventing extension of the mechanical wire by the wire retractor unless the charger state data indicates an authorized state indicating that an operator has been authorized to use the electric vehicle charger.

In at least some implementations, controlling the wire retractor based on the charger state data may include controlling the wire retractor to stop extension of the mechanical wire when the charger state data indicates that a connector associated with the electric vehicle charger has been connected to a charging port of an electric vehicle.

In at least some implementations, the instructions may further configure the controller to lock the wire retractor in response to detecting that the charger state data indicates that a connector associated with the electric vehicle charger has been connected to a charging port of an electric vehicle.

In at least some implementations, controlling the wire retractor based on the charger state data may include controlling the wire retractor to initiate retraction of the mechanical wire when the charger state data indicates that a connector associated with the electric vehicle charger has been disconnected from a charging port of an electric vehicle.

In at least some implementations, the cable management system may further include a terminal position sensor coupled to the controller. The instructions may further cause the controller to: detect, based on sensor data from the terminal position sensor that the mechanical wire is fully extended; and in response to detecting that the wire retractor is fully extended, stopping extension of the mechanical wire.

In at least some implementations, the cable management system may further include a terminal position sensor coupled to the controller. The instructions may further cause the controller to: detect, based on sensor data from the terminal position sensor that the mechanical wire is fully retracted; and in response to detecting that the wire retractor is fully retracted, stopping retraction of the mechanical wire.

In at least some implementations, the instructions may cause the controller to: determine that retraction is impeded; and in response to determining that the retraction is impeded, cause the wire retractor to pause retraction.

In at least some implementations, determining that the retraction is impeded may be performed by detecting a motor overload on a motor associated with the wire retractor.

In at least some implementations, determining that the retraction is impeded may be performed by detecting high tension at the wire tension sensor.

In at least some implementations, the instructions cause the controller to: determine that retraction is impeded; and in response to determining that the retraction is impeded, cause the wire retractor to extend the mechanical wire to provide slack to the mechanical wire.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 2:
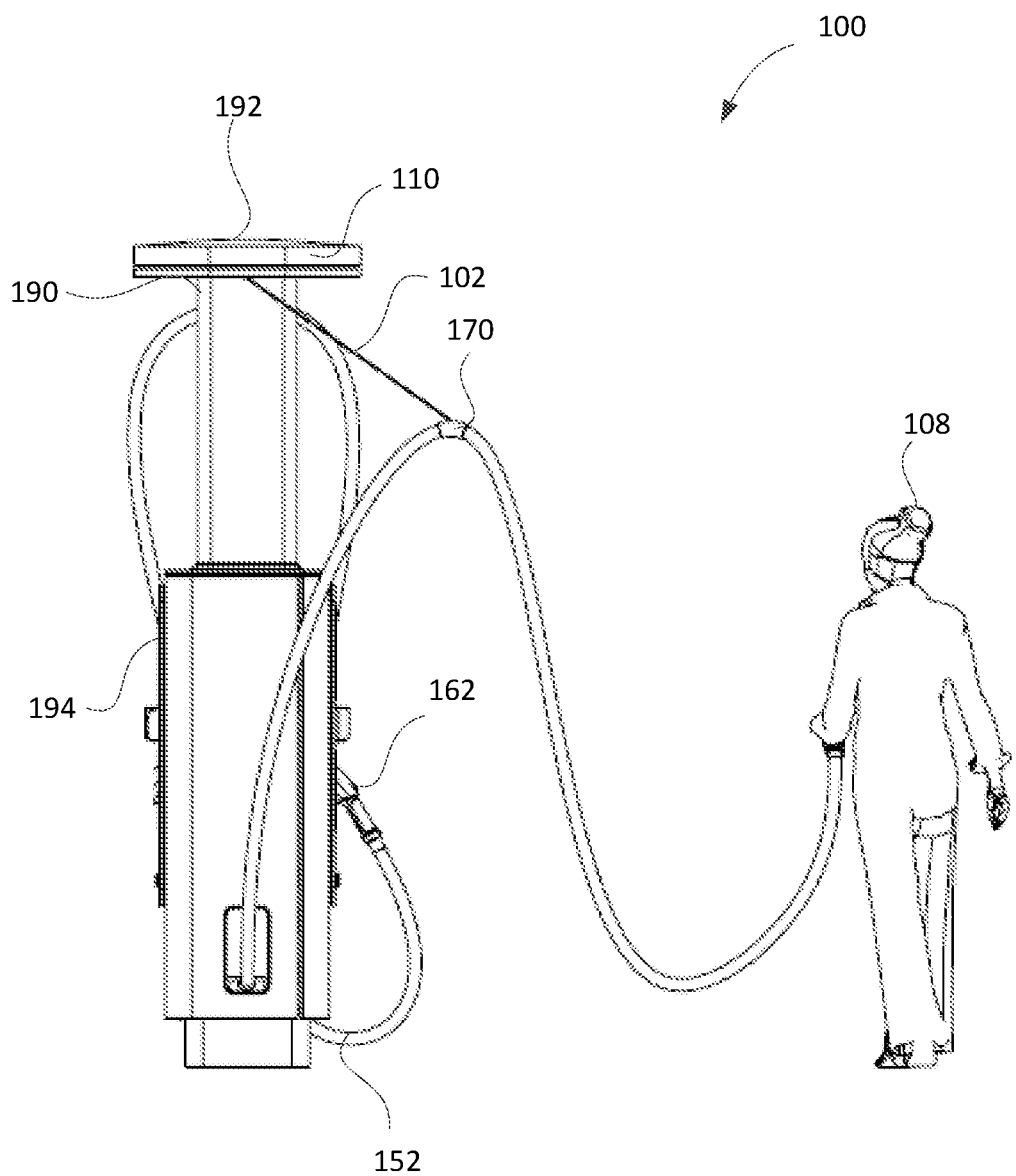
FIG. 2 is a left side elevation view of the EV charging station of FIG. 1 in accordance with an example of the present application.

Reference is made to FIGS. 1 and 2, which illustrate an electric vehicle (EV) charging station 100 in both perspective (FIG. 1) and left side (FIG. 2) views. The EV charging station may also be referred to herein as a charging station. The EV charging station 100 may include one or more EV chargers. In the illustrated example, the EV charging station 100 includes two EV chargers—a first EV charger 120 and a second EV charger 122. In other implementations, the EV charging station 100 may include a greater or lesser number of EV chargers than the EV charging station 100 of FIGS. 1 and 2.

Each of the EV chargers 120, 122 may allow the EV charging station 100 to concurrently charge a separate electric vehicle. For example, an EV charging station 100 having two EV chargers may concurrently charge two electric vehicles, an EV charging station 100 having three EV chargers may concurrently charge three EVs, and so on.

The EV chargers may be of various types including, for example, any one or more of Level 1 chargers, Level 2 chargers, Level 3 chargers, DC Fast chargers (DCFC), Level 4 chargers, and so on. In one implementation, the EV charging station 100 may include an EV charger that charges an EV at 400 volts or more.

The EV charging station may be installed at any one or more of: a residence, a business, a parking facility, or in an operating environment of another type. In at least one implementation, the EV charging station may be a roadside EV charging station.

Each of the EV chargers 120, 122 may include a charging cable 150, 152. For example, a first EV charger 120 may include a first charging cable 150 and a second EV charger 122 may include a second charging cable 152.

Each of the EV charging cables 150, 152 may, at one end, include a connector 160, 162. For example, the first EV charging cable 150 may include a first connector 160 and the second EV charging cable 152 may include a second connector 162. The first and second connectors 160, 162 may be of the same type or of different types. The connectors 160, 162 are configured to connect the EV chargers to an electric vehicle. More specifically, the connectors 160, 162 are configured to mate with a charging port of an electric vehicle. The connectors 160, 162 may be configured according to standards such as, for example CHAdeMO standards and/or SAE Combo standards. In some implementations, the connectors 160, 162 may be of one or more of the following types: Port J1772, CHAdeMO, SAE Combo CCS, Tesla HPWC and Tesla Supercharger.

An operator 108 may use the EV charging station 100 to charge an electric vehicle by extending one of the charging cables 150, 152 until one of the connectors 160, 162 can be aligned with the charging port of the electric vehicle. Then, the operator 108 may plug the connector 160, 162 into the charging port and the EV charging station 100 will initiate charging of a battery of the electric vehicle.

The charging cable 150, 152 may, in at least some implementations, be relatively long and/or relatively thick. A long charging cable 150, 152 allows an operator 108 greater flexibility for positioning their electric vehicle in a way that allows for physical connection between the connector 160, 162 and the charging port. In some implementations, the charging cable may be 10 feet or greater in length. In some implementations, the charging cable may be at least 12 feet long. In some implementations, the charging cable may be at least 20 feet long.

The thickness of the charging cable may, in some implementations, allow for high-speed charging of the electric vehicle. For example, a thicker charging cable may carry thicker wires or it may have a greater number of conductors than a relatively thinner charging cable which may allow the charging carry to deliver more power to the electric vehicle in order to reduce the charge time.

The length and/or thickness of the charging cable may make the charging cable 150, 152 difficult to use for at least some operators 108. For example, the charging cable may be relatively heavy and an operator 108 may find it difficult to extend the charging cable to allow for connection of the connector 160, 162 and the charging port of an electric vehicle. In order to make the charging cable easier to extend or retract, the EV charging station 100 may include one or more cable management systems, examples of which will be described in greater detail below.

In the illustrated example of FIGS. 1 and 2, the cable management system includes a mechanical wire 102 that is coupled to a charging cable 150 associated with the EV charger 120. In the illustrated example of FIGS. 1 and 2, only one mechanical wire 102 is visible. The EV charging station 100 may include more than one mechanical wire 102. For example, each of the EV chargers 120, 122 may be associated with a separate mechanical wire which is used for retracting and/or extending an associated charging cable. In the illustrated example, the visible mechanical wire 102 is shown in a partially extended state, which may also be referred to as a partially retracted state. This mechanical wire 102 is connected to a first charging cable 150 using a coupler 170. The coupler 170 may fixedly and/or rotatably connect an end of the mechanical wire 102 to the charging cable 150. The EV charger 120 may, in the illustrated example, include a second mechanical wire but since an operator is not using a second charging cable 152 associated with the second mechanical wire, the second mechanical wire is in a retracted state and is not visible.

The cable management system may, when a charging cable is not in use, retract the charging cable by retracting an associated mechanical wire 102. More specifically, the mechanical wire 102 may be drawn into an enclosure 110 associated with the EV charging station 100. When an operator 108 pulls on the charging cable 150, 152, the cable management system may provide additional slack to the charging cable 150, 152 by extending the mechanical wire 102 from the enclosure 110. The retraction and extension of the mechanical wire 102 controls the amount of slack in the charging cable 150. Put differently, the retraction and extension of the mechanical wire 102 controls how far the connector 160 of a connected charging cable can be moved relative to a stationary portion of the EV charging station 100, such as the enclosure 110.

In the illustrated example, the cable management system draws the mechanical wire 102 in from overhead. Put differently, the mechanical wire 102 extends out of the enclosure 110 at a top end of the enclosure 110. In this orientation, the mechanical wire 102, when retracted, lifts at least a portion of the charging cable 150 away from the ground.

Each EV charger 120, 122 may include a holster 180, 182 or other holder for holding an associated connector 160, 162 off the ground when an EV charger is not in use. In the illustrated example, when the EV charger 120, 122 is holstered, the cable management system operates to remove substantially all slack from the associated charging cable 150, 152. In some implementations, when the mechanical wire 102 is fully retracted and the associated EV charger 120, 122 holstered, the associated charging cable 150, 152 may be substantially or completely held off the ground.

The holster 180 may serve to protect the EV charger 120, 122 from damage due to environmental factors, such as rain, snow, etc. Additionally or alternatively, the holster 180 may serve to protect the EV charger 120, 122 from accidental damage from, for example, inadvertent contact with vehicles. The holster 180, 182 may, additionally or alternatively, hold the connector 160, 162 at a height that makes it more accessible. For example, the EV charger 120, 122 may hold the connector 160, 162 off of the ground at a height above the ground that makes it easy for the operator to grab the connector 160, 162 without having to bend. The holster 180, 182 may, in at least some implementations, hold the connector 160, 162 at a height above the ground that allows an operator in a wheelchair to easily grab the holster 180, 182.

As noted above, the EV charging station 100 may include a cable management system. The cable management system may perform any one or more of a number of functions which offer a number of operational benefits. For example, the cable management system may facilitate the extending of the charging cable 150, 152 to make it easier for the operator 108 to extend the charging cable 150, 152 to plug the connector 160, 162 into an electric vehicle. By way of further example, in some implementations, the cable management system may facilitate the retraction of the charging cable 150, 152 to make it easier for the operator 108 to move the charging cable 150, 152 back towards the enclosure after charging in order to, for example, holster the connector 160, 162. The assisted retraction and/or extension features provided by the cable management system may make the EV charging station 100 more accessible. For example, even an infirmed operator and/or disabled operator may be able to use the EV charging station 100 with ease. By way of yet further example, the cable management system may prevent damage to the charging cable by drawing the cable away from the ground where it might be damaged through accidental contact with a vehicle or, in some environments, maintenance equipment such as snow clearing equipment. By way of another example, the cable management system may prevent freezing of the charging cable to the ground by drawing at least a substantial portion of the charging cable away from the ground when the charging cable is not in use.

The cable management system described herein may also, in various implementations, be referred to as one or more of a cable extension system, a cable retraction system, a cable raising system, a cable freeze-prevention system, a cable retrieving system, a cable assist, and/or assistive equipment.

The cable management system or a portion of the cable management system may be housed in the enclosure 110 or a portion thereof. The enclosure 110 may include multiple parts. For example, the enclosure 110 may include a support 190, an upper housing 192 and a lower housing 194. The support 190 may be a columnar support. The support 190 may house one or more components of the EV charging station 100 such as one or more electrical wires providing power and/or communications to components housed within the upper housing 192. In some implementations, one or more such electrical wires may provide communications between components housed within the upper housing 192 and components housed within the lower housing 194.

The support 190 may support the upper housing 192 so that the upper housing remains fixed relative to one or both of the support 190 and the lower housing 192. The support 190 may hold the upper housing 192 in a generally horizontal orientation so that the upper housing 192 acts as a canopy or shade. The upper housing 192 may house the cable management system or a portion thereof. In some implementations, the upper housing may house portions of the cable management system. Conveniently, by including the cable management system within the upper housing 192, the cable management system may operate efficiently and/or may require a comparatively short mechanical wire 102. In at least some implementations, the mechanical wire 102 may have a length that varies due to various operational factors, such as temperature, an amount of force applied to the cable, etc. Reducing the length of the mechanical wire 102 may reduce such variability.

The upper housing 192 may be supported overhead of an operator. For example, the upper housing may be seven feet or more above ground. In at least some implementations, the upper housing 192 may act as or be referred to as a canopy.

The upper housing 192 may be generally horizontal when supported by the support 190. The upper housing 192 may serve a number of functions. For example, it may protect components of the cable management system from the elements, may provide shade or shelter to a user of the EV charging station 100 and/or it may provide an offset so that the mechanical wire 102 is extended from and retrieved within a location that is offset from one or more of the support 190 and the lower housing 194. In this way, the upper housing 192 may provide overhead cable management. In some implementations, the upper housing 192 may also include one or more visual indicators such as one or more lights. The visual indicators may be controlled to indicate, for example, whether a particular one of the EV chargers is in service, in use, available, etc.

An example cable management system 300 is illustrated in FIGS. 3 to 12. The example cable management system 300 is for an EV charger 120, 122, such as the EV charger 120, 122 of FIGS. 1 and 2. The cable management system 300 is a winch-style cable management system which uses a drum 302 to retrieve and extend a mechanical wire 102 in order to lift at least a portion of a charging cable 150, 152 away from the ground. More specifically, the drum 302 is rotated, by the cable management system 300, in a first direction in order to wind the mechanical wire 102 around the drum and to lift and/or retrieve an associated charging cable 150, 152 and it is rotated in a second direction in order to unwind the mechanical wire 102 from the drum to extend and/or lower that charging cable 150, 152.

The drum may include one or more slots 304, 306. Each of these slots may be for a different purpose. For example, a first slot 304 may be for receiving the mechanical wire 102 while the second slot 306 may be for receiving an extension feature such as a fin or other protrusion associated with a guide 320. The guide 320 functions to guide the mechanical wire 102 into or out of the first slot 304 and/or to maintain the mechanical wire 102 within the first slot 304. For example, the guide 320 may assist in preventing the mechanical wire from jumping tracks. That is, the guide 320 may prevent the mechanical wire from inadvertently moving to a different slot or to a different position within a slot.

Figure 12:
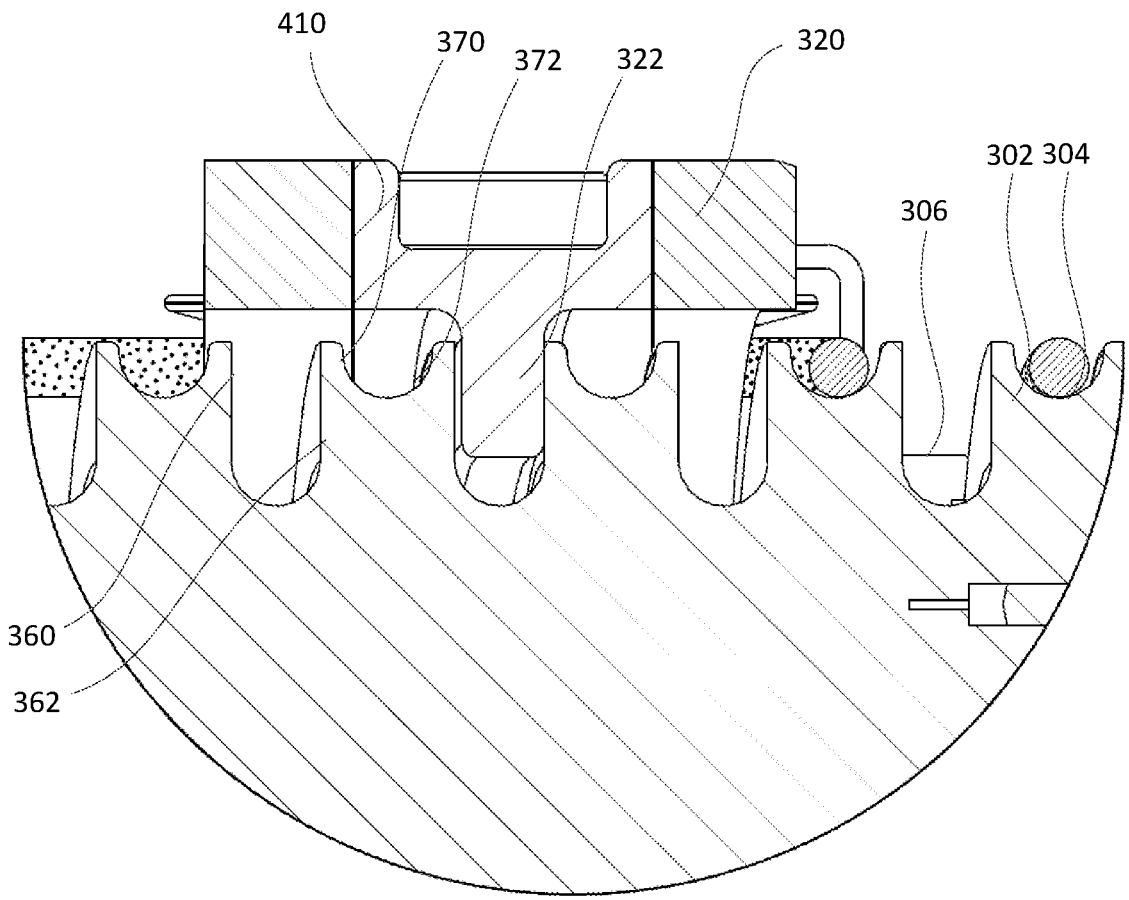
FIG. 12 is a detailed view of a region of the cross-sectional view in FIG. 11 of the cable management system of FIG. 3.
Figure 13:
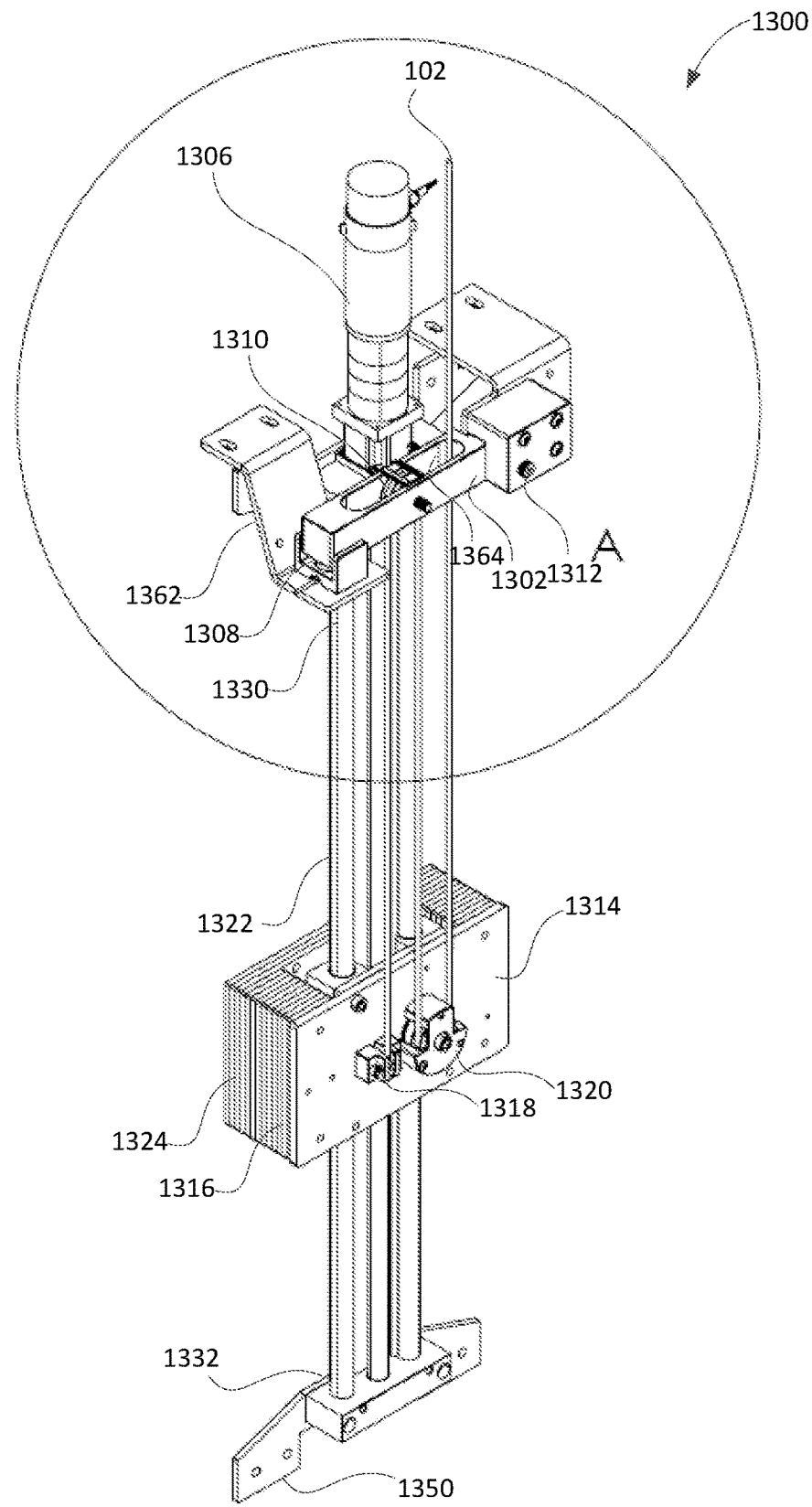
FIG. 13 is a perspective view of a carriage-based cable management system in accordance with an example of the present application.
Figure 14:
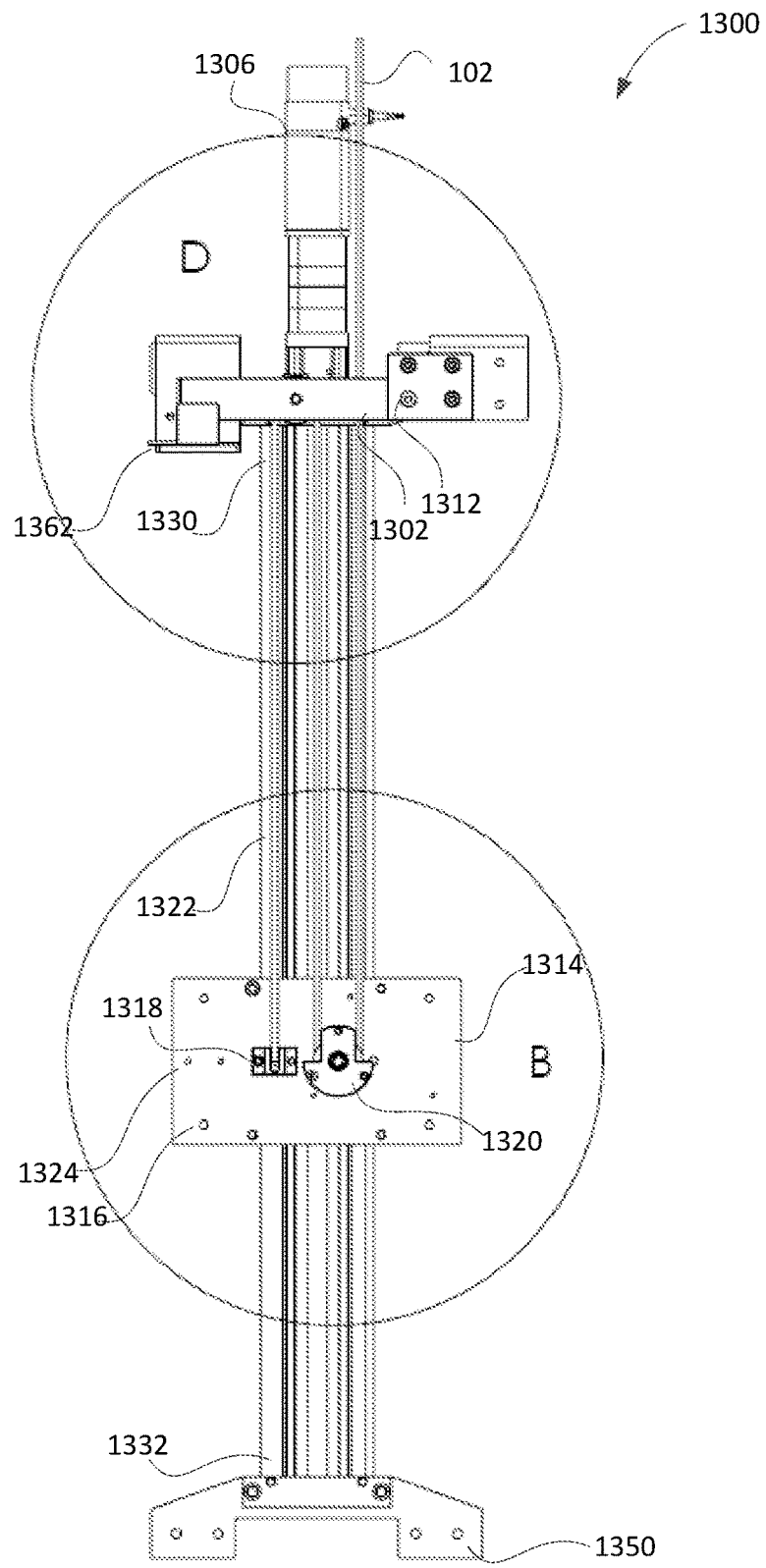
FIG. 14 is a front elevational view of the cable management system of FIG. 13.

The drum 302 may be a cylindrical drum. A cylindrical drum is a drum that is cylindrical or substantially cylindrical in shape. The slots 304, 306 are tracks that are formed in or on a surface of the drum 302 and the slots 304, 306 may also be referred to as tracks. The slots 304, 306 may be defined by respective sidewalls. For example, as illustrated in FIG. 12, the first slot 304 may be defined by a first sidewall 370 and a second sidewall 372 and the second slot 306 may be defined by a separate first sidewall 360 and a separate second sidewall 362. The depth of each of the slots 304, 306 may be different. For example, as illustrated in FIG. 12, the first slot 304 may be more shallow than the second slot 306. Put differently, the second slot 306 may be deeper than the first slot 306. The depth of the first slot may be based on the thickness of the mechanical wire 102. For example, the depth of the first slot may correspond to the thickness of the mechanical wire 102. In at least some implementations, the depth of the first slot may be greater than the thickness of the mechanical wire.

The second slot 306 may be deeper than the first slot 304 since the second slot receives a protrusion 322 of the guide 320. The protrusion 322 extends into one of the slots. Specifically, the protrusion extends into the second slot 306. The protrusion may also be referred to as a fin. As the drum rotates, the protrusion travels through the second slot 306 in a direction that is based on the direction of the rotation. In some implementations, to ensure good mechanical operation, the protrusion 322 may be deeper and/or longer than the thickness of the mechanical wire 102 and so the second slot 306 may be deeper than the first slot 304.

The first slot 304 which receives the mechanical wire may perform a number of functions. For example, the first slot 304 may function to prevent the mechanical wire from becoming tangled on the drum 302, which may happen if the mechanical wire were not included. Further, the first slot 304 may also aid in removing debris, ice or snow that has become attached to the mechanical wire. For example, the mechanical wire 102 may contact the first slot 304 and, more particularly, the sidewalls 370, 372 of the first slot, which may rub the mechanical wire 102 and dislodge debris, ice or snow build up.

The width of the first slot 304 is at least as wide as the thickness of the mechanical wire so that the mechanical wire 102 may be received within the first slot 304. The width of the first slot 304 may be slightly larger than the thickness of the mechanical wire 102 (e.g., within 5% in some implementations) to reduce friction between the mechanical wire and the first slot 304. Such sizing may help to dislodge debris, ice and snow without resulting in undue friction between the mechanical wire and the first slot which might impede operation. Further, the tight tolerance may allow for a compact drum 302 which winds a relatively long mechanical wire 102. In other implementations, the width of the first slot 304 may be even greater.

In some implementations, the width of the second slot 306 is the same or similar to the width of the first slot 304. In other implementations, the widths may be different. For example, the second slot 306 may have a width that is wider than the width of the first slot 304 to allow a wider protrusion 322 to be received.

The slots 304, 306 may be helical slots. For example, the first slot 304 and the second slot 306 may each be a separate helical slot. Put differently, the first slot 304 and the second slot 306 may wind around the drum in a helical form. Put differently, the slots 304, 306 may be corkscrew-shaped tracks. In this way, the slots 304, 306 at any given location of the drum 302 may alternate. The first slot 304 may be aligned with the second slot 306. That is, at any portion of the drum, the first slot 304 may have at least one second slot 306 adjacent to it that is running in the same direction as the first slot 304 at that location.

The slots 304, 306, which may be helical, may share a helix axis. This helix axis may also be a rotational axis of the drum 302. The rotational axis of the drum 302 is an axis at the center of the drum 302 about which the drum 302 rotates.

The drum 302 rotates about the rotational axis in order to extend or retract the mechanical wire 102. Such rotation may be induced by a drive system 340 which is illustrated, for example, in FIGS. 3 and 10. The drive system 340 selectively rotates the drum in a first direction to retrieve the mechanical wire 102 and in a second direction to extend the mechanical wire 102.

Figure 3:
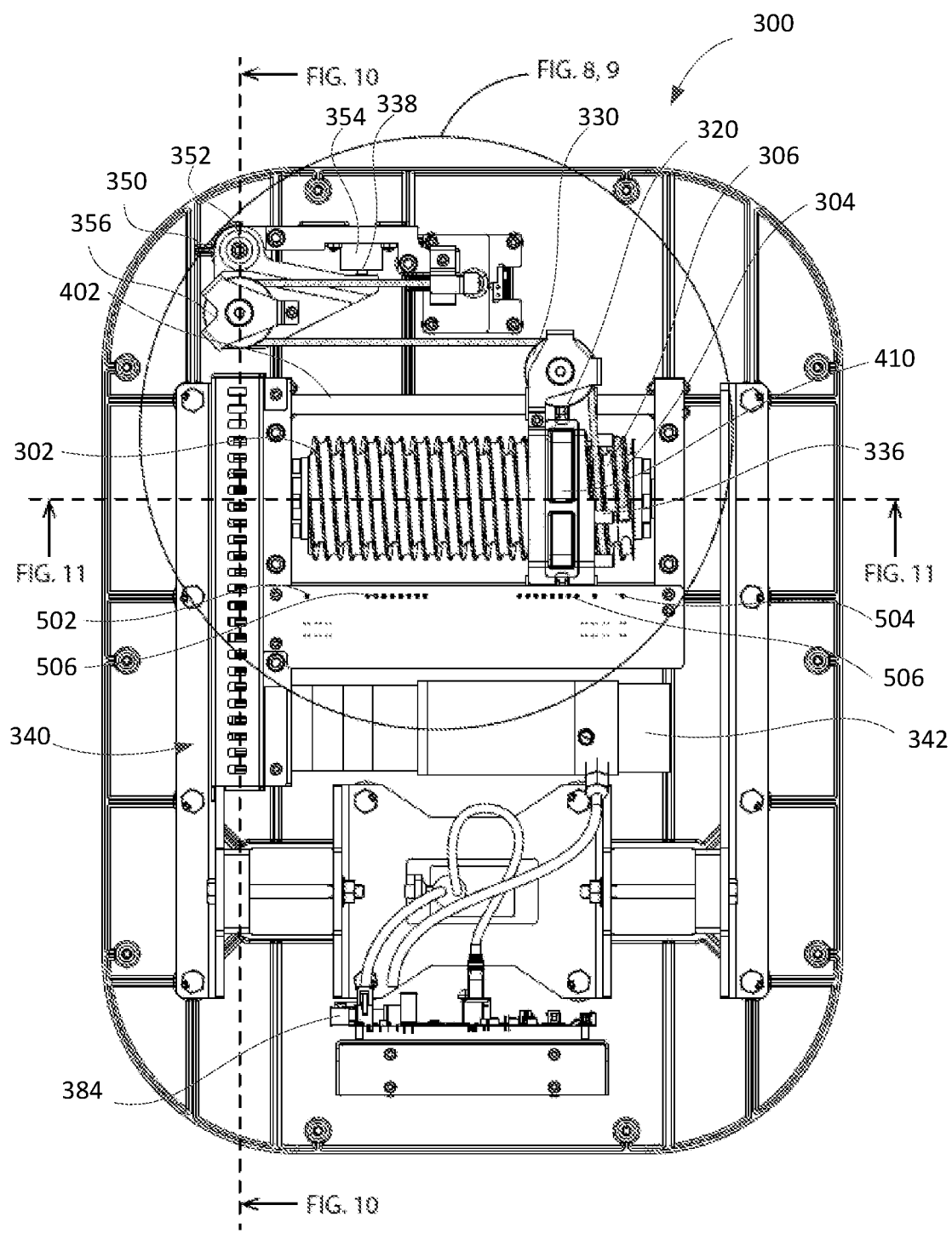
FIG. 3 is a front view of a winch-based cable management system for an EV charging station in which one side of a housing has been removed to illustrate the arrangement of internal components.

The drive system 340 may include a motor 342 (FIG. 3). The motor 342 is coupled to the drum 302 so that rotation of the motor causes rotation of the drum 302. The motor 342 may be electrically connected to a controller and may rotate the drum 302 in response to a signal received from the controller. That is, controller may control movement of the motor 342. The controller may be considered to be part of the drive system 340. In some implementations, the controller may be provided on a control circuit 384 (FIG. 3) which may be housed in an enclosure 110 that houses the cable management system 300.

Figure 10:
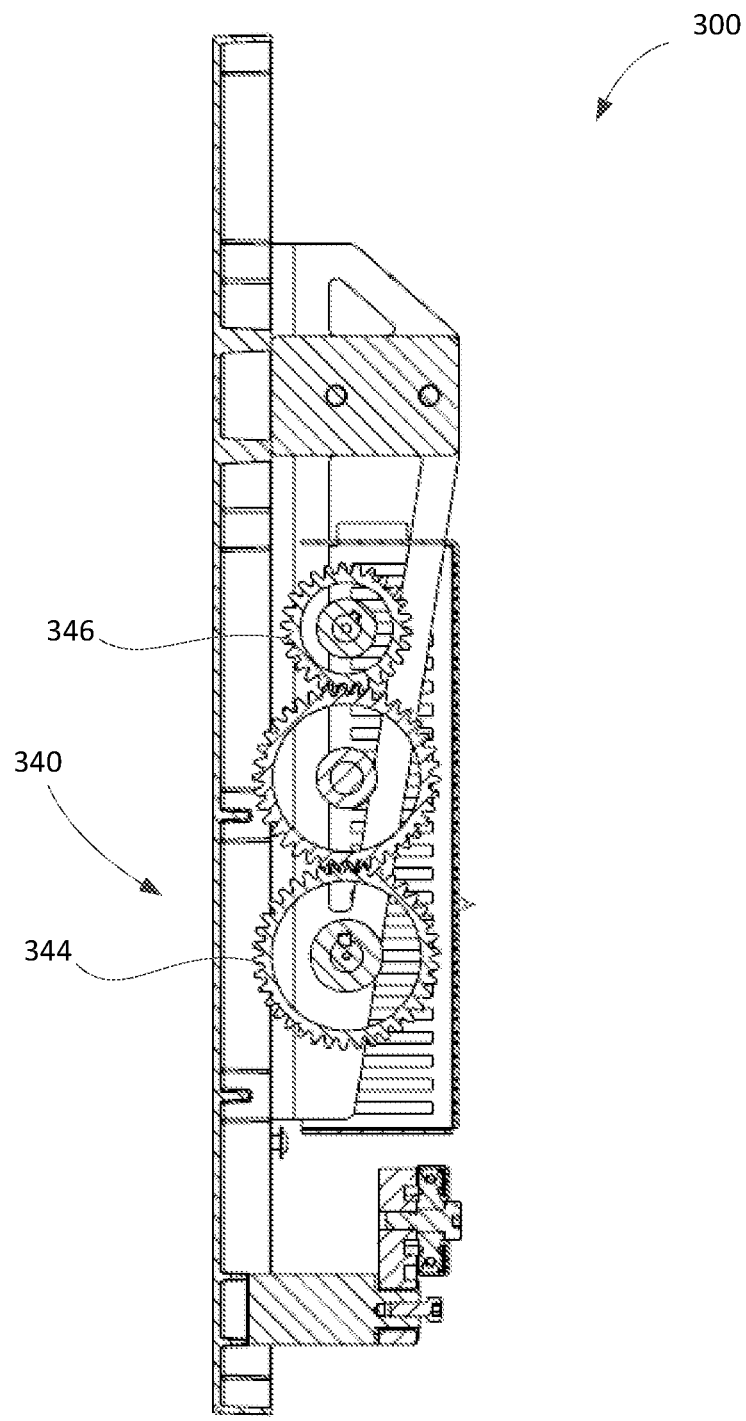
FIG. 10 is a cross-sectional view of the cable management system of FIG. 3 taken along the line marked FIG. 10 of FIG. 3.
Figure 11:
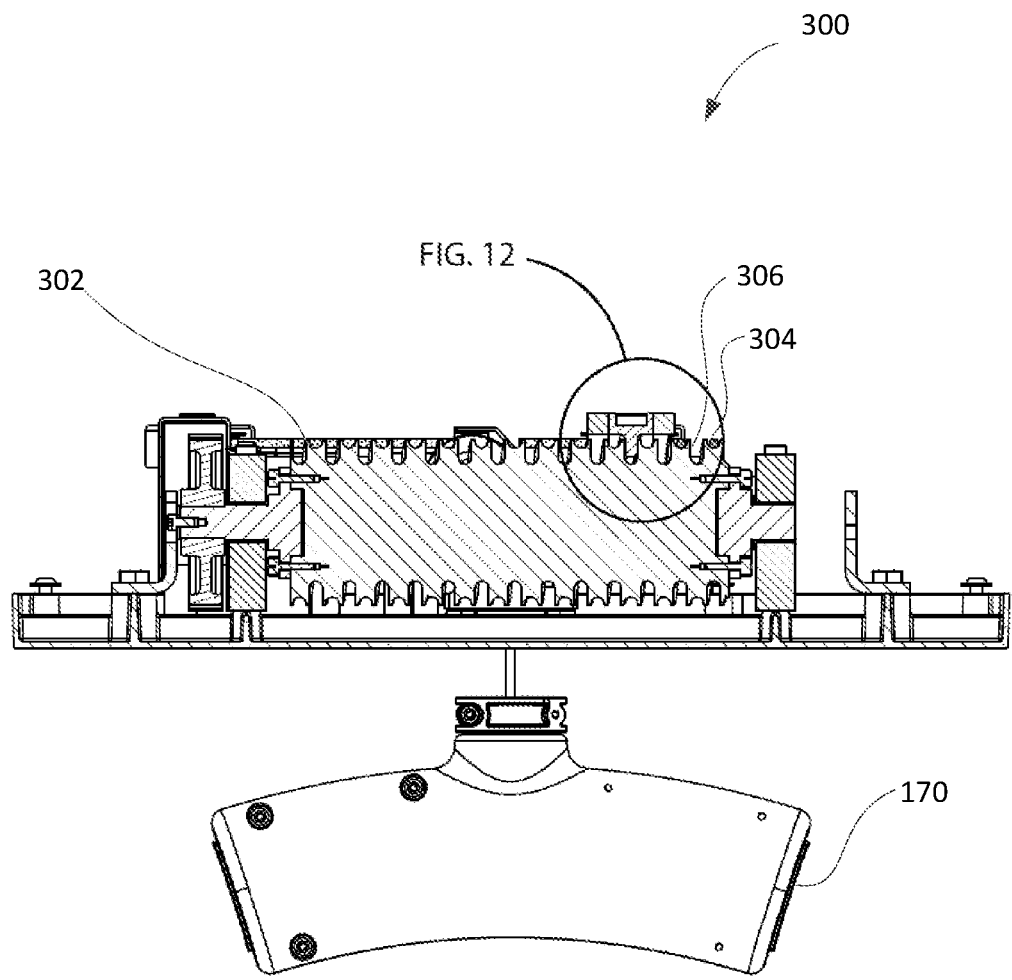
FIG. 11 is a cross-sectional view of the cable management system of FIG. 3 taken along the line marked FIG. 11 of FIG. 3.

As illustrated in FIG. 10, the drive system 340 may include one or more gears. In such implementations, it may be referred to or may be said to include a gear system. The gear system may include at least one driving gear 344 and at least one driven gear 346. The driving gear 344 is coupled to the motor 342 so that rotation of the motor causes rotation of the driving gear 344. Rotation of the driving gear then induces rotation in one or more other gears, such as the driven gear 346. The driven gear 346 may be coupled to the drum 302 so that rotation of the driven gear 346 causes rotation of the drum. The number of gears and the gear ratios may vary to obtain a desired speed and direction of rotation of the drum 302 relative to the speed and direction of the motor and speed of retraction or extension of the mechanical wire 102 relative to the speed or direction of the drum.

The drive system 340 may be of a different types. For example, it may be that the drive system includes a belt drive system. In other implementations, the drive system may operate through a direct coupling of the motor 342 to the drum 302.

Figure 4:
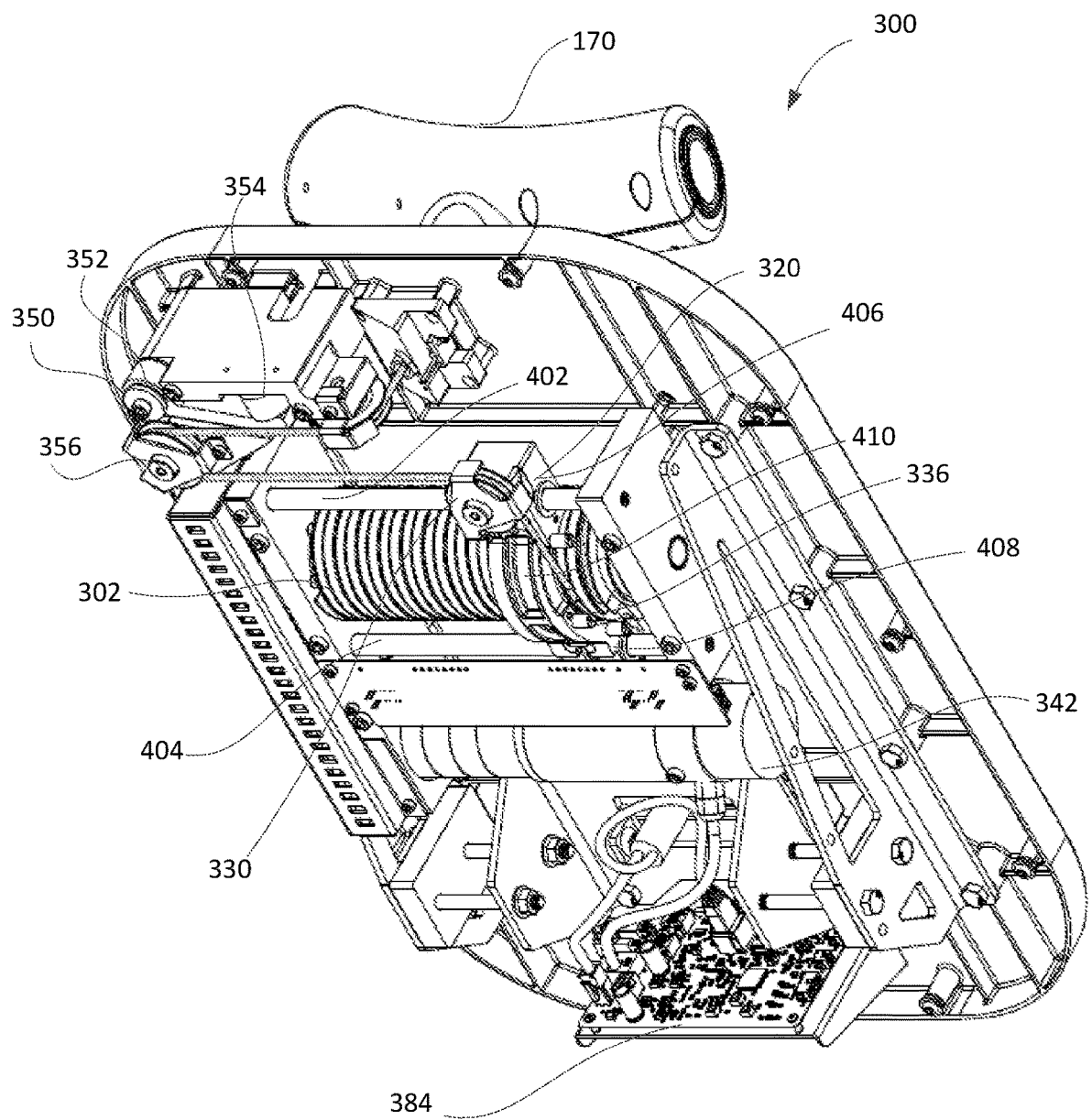
FIG. 4 is a top right perspective view of the cable management system of FIG. 3.
Figure 5:
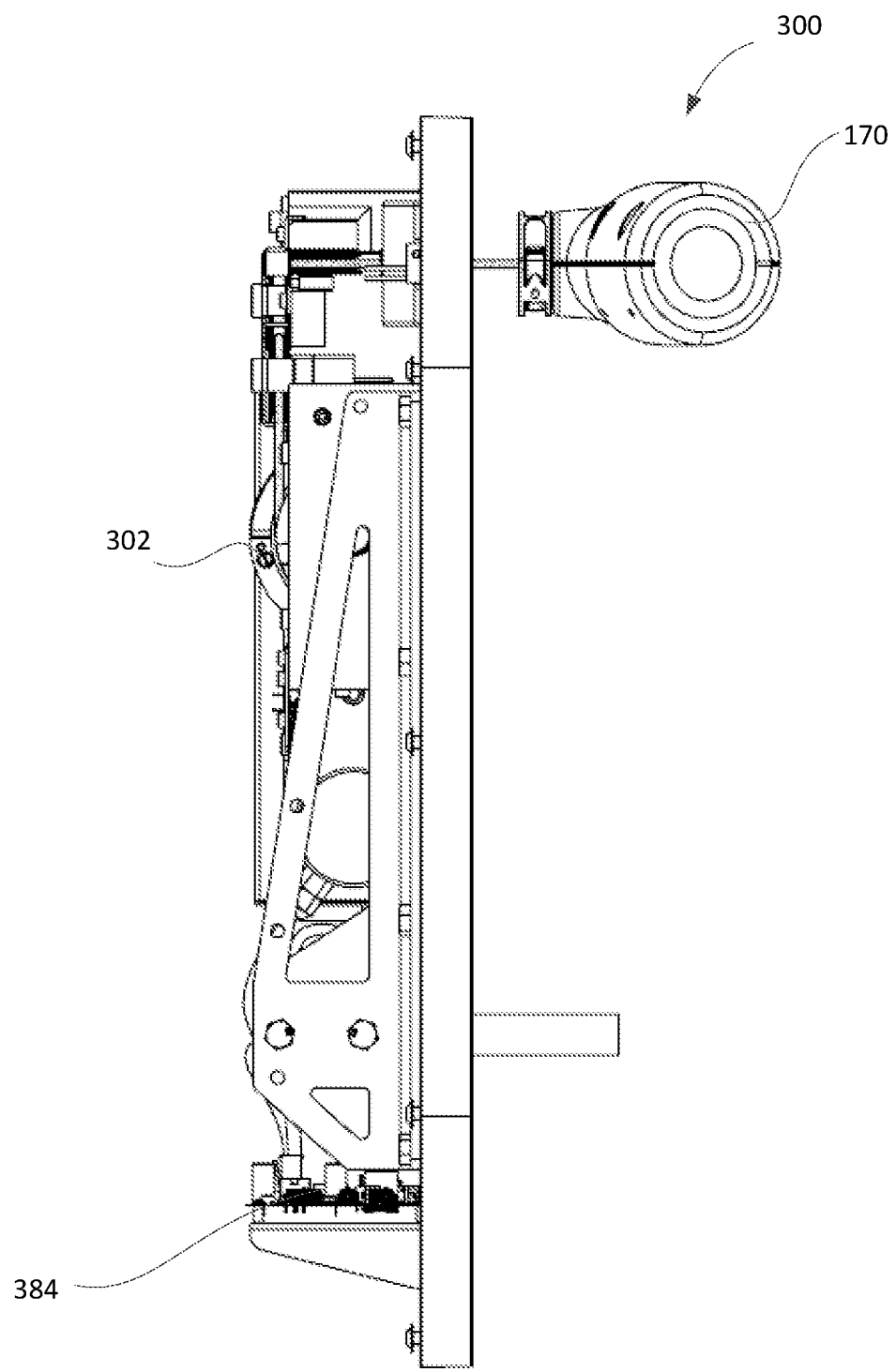
FIG. 5 is a right side elevational view of the cable management system of FIG. 3.
Figure 6:
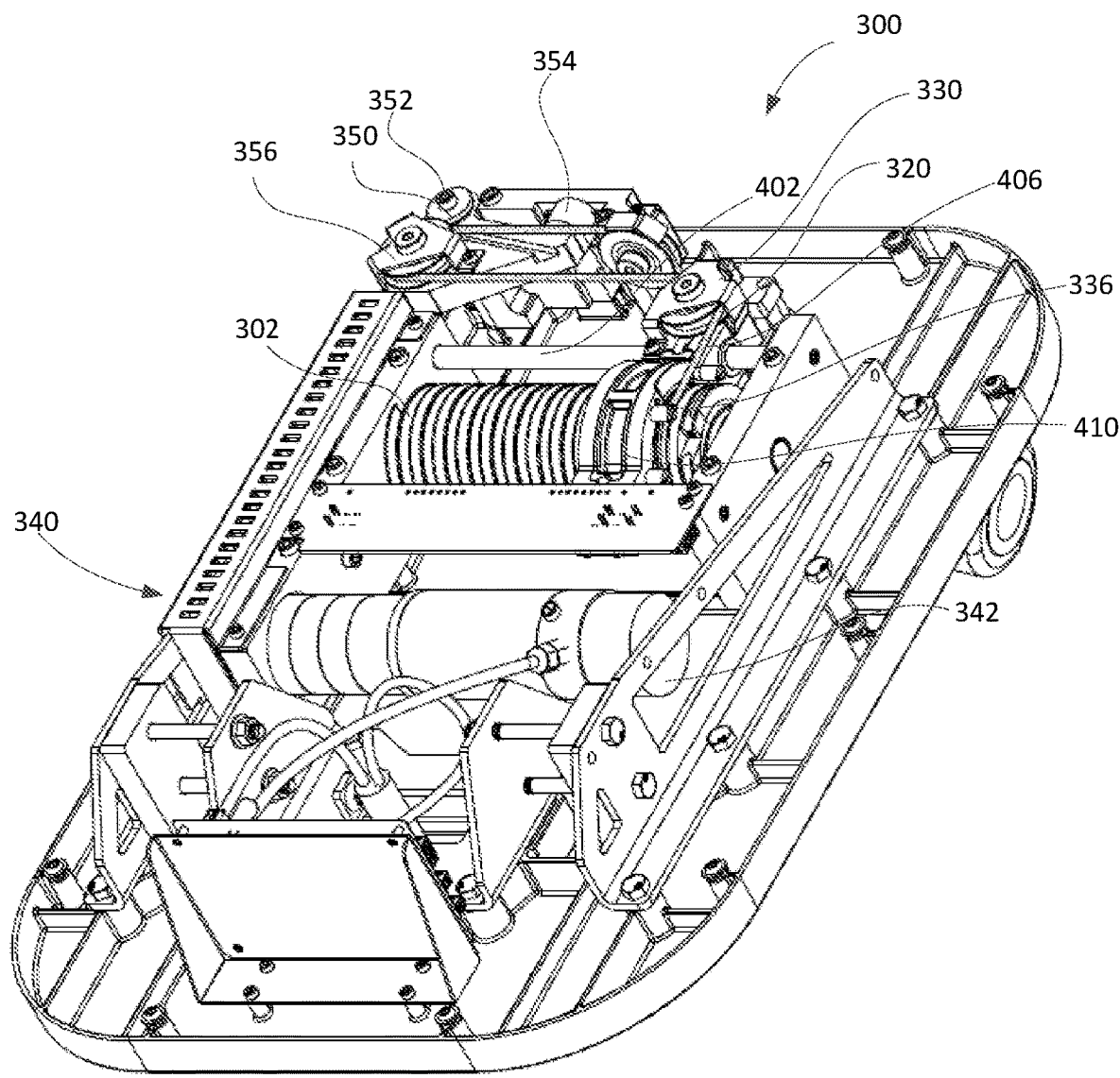
FIG. 6 is a bottom right side perspective view of the cable management system of FIG. 3.
Figure 7:
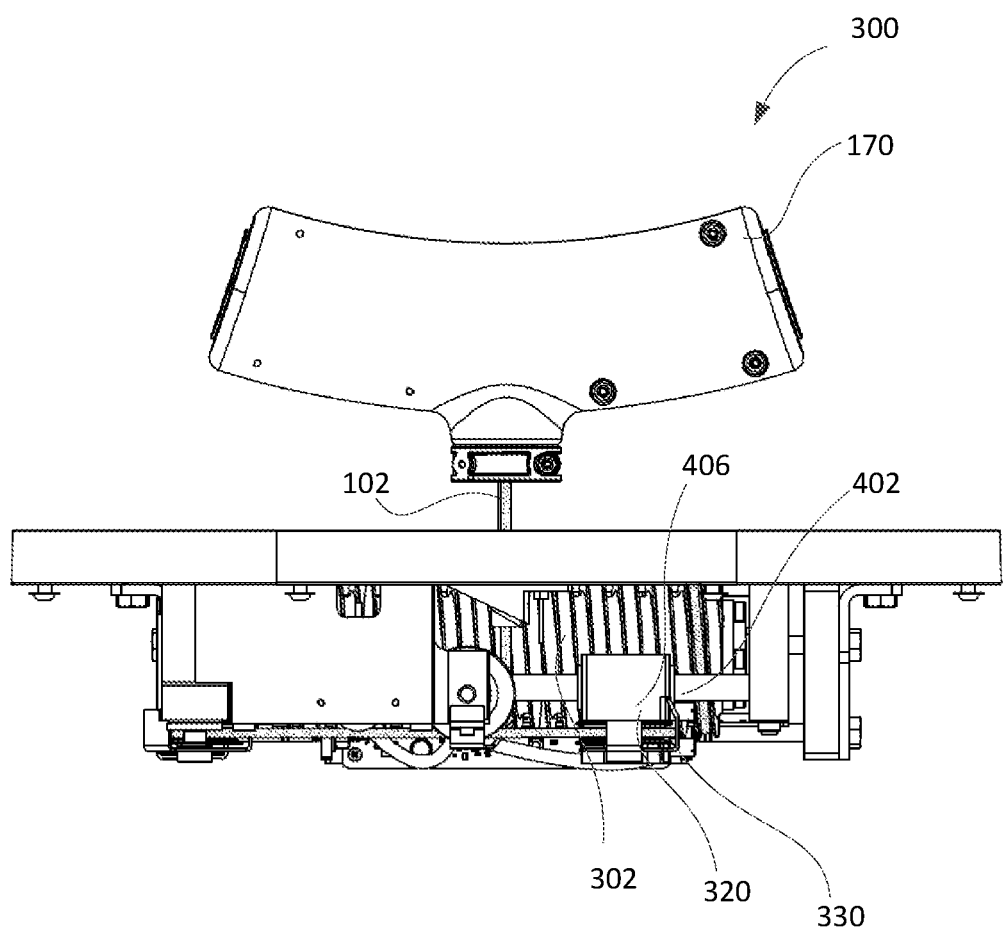
FIG. 7 is a top side elevational view of the cable management system of FIG. 3.

As noted previously, rotation of the drum 302 may cause winding or unwinding of the mechanical wire 102 around the drum 302. To facilitate the orderly winding or unwinding of the mechanical wire 102, the cable management system 300 may include one or more wire alignment features. For example, as best illustrated in FIG. 4, the cable management system 300 may include one or more tracks 402, 404. In the illustrated example, the cable management system 300 includes two tracks 402, 404. The tracks are fixed in spaced relation to the drum. For example, the tracks may be fixed relative to the rotational axis of the drum so that the tracks remain in a fixed position relative to this axis. The tracks may be parallel to the rotational axis of the drum 302.

In the illustrated example, the tracks 402, 404 are cylindrical tracks. For example, the tracks 402, 404 may be formed as rods. The track(s) 402, 404 may, in at least some implementations, be referred to as rails. For example, the track(s) 402, 404 may be linear rails such as linear guide rails. In the illustrated example, there are two tracks which are mounted an opposing sides of the drum 302. For example, the first track 402 may be mounted at a first side of the drum 302 and the second track may be mounted at a second side of the drum 302.

The cable management system 300 may also include a guide 320. The guide 320 may be slidably coupled to one or more of the tracks 402, 404 (FIG. 4). That is, the guide 320 may be attached to and/or positioned on the track(s) 402, 404 (FIG. 4) so that it may be moved along the track(s). More specifically, the guide 320 may be moved to slide laterally along the track(s) 402, 404. The guide 320 may include one or more track-engaging portions. These portions may be referred to as slides 406, 408 or slide portions or slide blocks or carriages. For example, a first slide 406 may engage a first track 402 and a second slide 408 may engage a second track 404. The slides 406, 408 may take a variety of forms. In one example, the slides 406, 408 may be or include pillow blocks. The slides 406, 408 may include one or more friction-reducing features such as one or more ball bearings. The ball bearings may be internally mounted within a passage that receives the track 402, 404, such as within a bore hole associated with the slides. Other track and guide arrangements are also possible.

The guide 320 slides laterally along the one or more tracks 402, 404 in response to rotation of the drum 302 about its rotational axis. Such lateral movement may be induced by the protrusion 322 (FIG. 12) which extends within the second slot 306. The track(s) 402, 404 are positioned to hold the protrusions 322 within the second slot 306. The track(s) ensure that any movement of the guide 320 is lateral. That is, the tracks, which are parallel to the rotational axis of the drum 302, ensure that the guide 320 only moves laterally along the drum 302. As the drum rotates, the guide 320 moves from side-to-side along the drum so that it is aligned with different portions of the slots as the drum rotates.

The guide 320 may include a portion that spans multiple slides 406, 408. For example, the guide 320 may include a curved portion 410. The curved portion 410 may connect to each of the slides 406, 408. The curved portion 410 may have a curve that corresponds to the curve of the drum. The curved portion 410 may also be referred to as radial portion.

In some implementations (not illustrated), the curved portion 410 may provide a housing which houses at least a portion of the mechanical wire 102. For example, the curved portion may be oriented so that the mechanical wire 102 wound underneath the curved portion 410; that is, between the curved portion 410 and the drum 302. In this way, the curved portion may function to protect the mechanical wire 102. For example, it may prevent the mechanical wire from jumping a track. For example, the curved portion might house a portion of the mechanical wire that is immediately adjacent to the portion of the first slot that is actively receiving or extending the mechanical wire.

The guide 320 includes one or more guide features. The guide features may also be referred to as alignment features. The guide features are for guiding the mechanical wire on and off of the first slot 304. The guide features may be or include a pulley 330. The pulley 330 may be in alignment with the portion of the first slot 304 that is actively receiving or extending the mechanical wire 102. For example, the pulley 330 may be aligned when a groove defined along the circumference of the pulley that is used for locating the mechanical wire along the pulley is aligned with the first slot 304. Such alignment may be said to occur when the pulley and drum are oriented such that the mechanical wire 102 may be drawn between the pulley 330 and the portion of the first slot 304 that is actively receiving or extending the mechanical wire 102 without having to cross, overlap and/or intersect the sidewalls 360, 362, 370, 372 of any slots.

The guide feature, such as the pulley 330 (FIG. 9), is provided on the guide 320. In the example illustrated, the guide feature is attached to one of the slides 406, 408. As the guide 320 slides laterally along the one or more tracks in response to rotation of the drum, the guide feature, such as the pulley 330 also slides laterally. In this way, the guide feature becomes aligned with different portions of the first slot 304 as the drum rotates. In this way, the guide feature continues to guide the mechanical wire into or out of an active portion of the slot during the complete winding or unwinding of the mechanical wire 102 about the drum 302.

The sliding pulley 330 helps to guide the mechanical wire onto the drum 302. The pulley 330 may also provide other functions instead of or in addition to such guide functions. For example, the pulley may serve to remove dust, debris, snow and/or ice from the mechanical wire 102. In some implementations, the pulley may include features that are designed to enhance such removal. For example, the groove of the pulley may be sized to closely fit the mechanical wire 102 so that any debris, snow or ice may be dislodged through impact with the sidewalls of the groove. In one implementation, an internal width of the groove may be no more than 5% larger than the thickness of the mechanical wire 102.

The pulley 330 also functions to change a direction of a force and to re-orient the mechanical wire 102. For example, the pulley 330 may direct the mechanical wire to another pulley or to an outlet port of the enclosure 110 that houses the cable management system 300. The outlet port serves to pass the mechanical wire 102 from inside the enclosure 110 to outside of the enclosure 110.

The guide feature may include other alignment or guide features instead of or in addition to the pulley. At least some such features may operate to restrain a portion of the mechanical wire 102 that has already been wound onto the drum 302 so that such portion does not jump track by inadvertently moving to another slot. By way of example, the guide features may include an extension 336 that extends over a portion of the first slot. The extension 336 may for example, extend over a portion of the first slot 304 that is actively receiving the mechanical wire. In some instances, the extension 336 may contact the mechanical wire 102. In this way, the extension 336 may remove debris and snow from the mechanical wire. For example, the extension 336 may, in some implementations, remove debris and snow from the mechanical wire 102 prior to winding the mechanical wire 102 on the drum 302. The extension may be mounted to the guide 320 so that it is near enough the drum to restrain the mechanical wire from skipping slots. For example, the distance between the extension and the upper side of a first slot 304 of the drum 302 may be less than the thickness of the mechanical wire.

The mechanical wire 102 may be fixedly connected to the drum 302 at one end of the mechanical wire 102. This connection may be made within the first slot 304. The connection may be made with a coupler, in some implementations. For example, a coupler may be connected to or provided on the drum 302 for receiving the mechanical wire 102 in the first slot 304. The coupler may be a mechanical disconnect that is configured to mechanically release the mechanical wire from the drum 302 when a force greater than a threshold is applied to the mechanical wire 102. That is, the mechanical disconnect will release the mechanical wire 102 to detach it from the drum 302 when the mechanical wire is pulled with too large a force. The mechanical disconnect may be designed with an integrated break point.

For example, the mechanical disconnect may include a breaking feature which causes the mechanical wire to be automatically cut or to be released when it is pulled with too great a force. The mechanical disconnect may protect the cable management system 300 from damage if, for example, the mechanical wire gets caught on something such as a vehicle which then drives away.

The mechanical wire 102 may be constructed of a material that prevents the accumulation of snow and ice on the mechanical wire 102. In at least some implementations, the mechanical wire may be a high molecular polyethylene wire.

The cable management system 300 may include the enclosure 110 (FIG. 1) and other portions of the cable management system 300 may be provided within the enclosure. In at least some implementations, the enclosure 110 may enclose an electric vehicle charger or a portion of an electric vehicle charger. For example, the enclosure may house charging components of the electric vehicle charger. In some implementations, the cable management system 300 may be provided in the upper housing 192. For example, the drum 302, the guide 320, the tracks 402, 402 may be housed in the upper housing 192. As noted above, the upper housing 192 may be supported by a support 190. The support 190 may hold the upper housing 192 overhead of an operator of the electric vehicle charger.

In some implementations, the motor may also be housed in the upper housing 192. In some implementations, the upper housing 192 may be insulated and heat generated by the motor or by an auxiliary heater positioned in the upper housing may serve to melt any snow or ice that is stuck to the mechanical wire 102. The heat may also, in at least some implementations, make the mechanical wire 102 more malleable.

As noted above, the cable management system 300 includes components that serve to retract or extend a mechanical wire. The cable management system 300 or a portion thereof may be referred to as a wire retractor 800, in at least some implementations. For example, the drum 302, tracks 402, 404, motor and/or guide 320 may form a wire retractor 800. The wire retractor 800 is configured to retract and extend the mechanical wire 102.

The drive system 340 may be configured to selectively rotate the drum 302 based on an output of a sensor 338. As noted above, the motor may be electrically connected to the controller and may move the drum in response to a signal received from the controller. That is, the controller may control movement of the motor and drum.

The cable management system 300 may include the sensor 338 and the sensor 338 may be connected to the drive system 340. For example, the sensor 338 may be coupled to a controller of the drive system 340. That is, the controller may be electrically connected to the sensor 338. The sensor 338 is configured to sense an external force applied to the mechanical wire 102 such as a force applied by an operator 108 indirectly to the mechanical wire 102 through pulling of a charging cable coupled to the mechanical wire 102. For example, the sensor 338 may be configured to sense a tension applied to the mechanical wire 102. The controller receives a sensor output from the sensor 338 and then selectively controls the wire retractor, by controlling the motor, based on a sensor output of the sensor 338. More particularly, the controller may cause the wire retractor to selectively retract or extend the mechanical wire from the enclosure based on the sensor output to selectively apply a force to the charging cable. In order to initiate retraction, the controller may cause the motor to rotate in a first direction and, in order to initiate extension of the mechanical wire, the controller may cause the motor to rotate in a second direction, opposite the first. Put differently, the controller may cause retraction by rotating the drum in a first direction and may cause extension of the mechanical wire by rotating the drum in a second direction.

The controller may, for example, be configured to determine, based on the sensor output, when an operator is pulling on the charging cable. In response to determining that an operator is pulling on the charging cable, the controller may activate the wire retractor to extend the mechanical wire; for example, by rotating the drum in a particular direction. The controller may, additionally or alternatively, be configured to determine, that the mechanical wire should be retracted based on, for example, determining that the charging cable has been disconnected from an electric vehicle. Upon detecting such a condition, the controller may activate the wire retractor to retract the mechanical wire; for example, by rotating the drum in another direction. In some implementations, the controller may detect other conditions based on the sensor output or other data. For example, the controller may detect when the charging cable has been plugged into an EV and, in response, it may lock the wire retractor. Locking the wire retractor may prevent a force from being applied to the port of the EV, which may damage the port.

Figure 8:
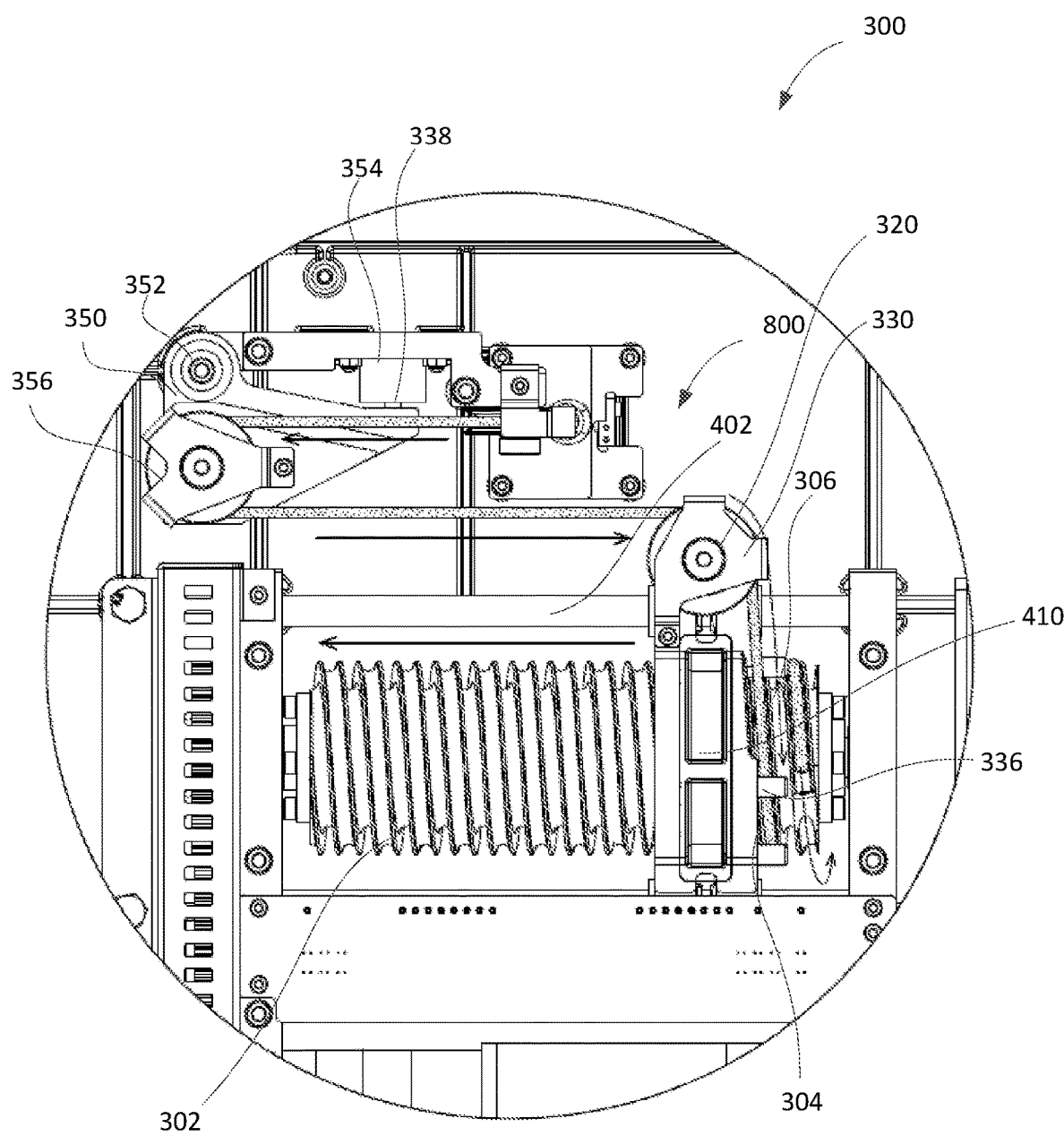
FIG. 8 is a detailed view of a region of the front elevational view of the cable management system of FIG. 3 showing a cable guide when a mechanical wire is substantially extended.

The sensor 338, as illustrated, for example, in FIG. 8, may be or include a load cell. The load cell may be a force sensor and/or a pressure sensor. The load cell may be an array of pressure-sensitive components mounted on a rigid plate. The load cell may generate a sensor output based on an amount of force and/or pressure applied to the load cell. The cable management system 300 may include a transfer lever 350 which transfers a force applied to the mechanical wire 102 to a force on the transfer lever 350. The transfer lever 350 may be pivotally mounted in the enclosure at a pivot point 352. That is, the transfer lever 350 may rotate about a pivot point 352. The transfer lever 350 may be rotatable about the pivot point to selectively active the sensor 338. For example, the sensor 338 may be activated when the transfer lever 350 is in a first position or orientation or deactivated or activated to a lesser extent when the transfer lever is in a second position or orientation. Put differently, the sensor may have a larger force or load applied to it by the transfer lever when the transfer lever 350 is in a first position or orientation than when it is in a second position or orientation. The amount of rotation of the transfer lever 350 when a force is applied to the mechanical wire 102 may be very small. In some instances, the rotational movement may be imperceptible to a human eye. In some implementations, the portion of the transfer lever 350 that contacts the sensor may move by an amount that is only a few mils, for example. In some implementations, the transfer lever 350 remains in contact with the sensor when no external force is applied to the mechanical wire 102 (i.e., when a user is not pulling on the charging cable) but the load reflected by sensor data generated from the sensor reflects a smaller load than when the charging cable is pulled to cause the mechanical wire to be pulled and the transfer lever to rotated slightly to apply a greater force to the sensor.

The sensor 338 may be mounted within the enclosure. The sensor 338 may be mounted near the transfer lever 350 in a position at which it may be engaged by the transfer lever 350 and at a position at which it may be engaged to a greater extend when the transfer lever 350 is rotated slightly due to a pulling force exerted on the mechanical wire 102. The sensor 338 may be aligned with a portion of the transfer lever 350 that is in spaced relation to the pivot point 352.

That is, the sensor 338 is mounted at a portion of the transfer lever 350 that does not align with the pivot point 352 so that movement of the transfer lever about the pivot point 352 causes the sensor 338 to be activated. In the example illustrated, the sensor 338 is mounted on a support 354. The support 354 holds the sensor 338 in a fixed position. That is, in the illustrated example, the sensor 338 does not move.

The transfer lever 350 is configured to be moved based on a force that is applied to the mechanical wire 102. In this way, the transfer lever 350 may transmit a force that is applied to the mechanical wire to the loadcell. In order to translate a force on the mechanical wire 102 into movement of the transfer lever 350, the cable management system 300 may include a force transmission coupler 356. The force transmission coupler 356 is, in the illustrated example, a pulley. The pulley may be connected to the transfer lever 350. The pulley or other force transmission coupler receives the mechanical wire 102 and transmits at least a portion of a force applied to the mechanical wire to the transfer lever 350 to cause the transfer lever 350 to pivot. The pulley or other force transmission coupler 356 may be connected to the transfer lever 350 at a portion of the transfer lever 350 that is in spaced relation to the pivot point. That is, the force transmission coupler is away from the pivot point so that a force applied to the force transmission coupler 356 by the mechanical wire 102 induces a small rotational movement of the force transmission coupler 356. A force applied to the mechanical wire 102 to the transfer lever may, for example, cause the transfer lever to pivot from the first position or orientation to the second position or orientation to activate the sensor to a greater extent. That is, the transfer lever causes a greater pressure to be applied to the sensor when the mechanical wire 102 is pulled, transmitting a force to the transfer lever.

In some implementations, the cable management system 300 may include one or more other sensors instead of or in addition to the sensor 338. For example, the cable management system 300 may include one or more retraction and/or extension state sensors, such as winding state sensors. The winding state sensors may detect an amount of the mechanical wire that has been wound onto the drum 302. That is, the winding state sensors may be configured to detect an amount of winding on the drum. In at least some implementations, the winding state sensors may be configured to detect the amount of winding by detecting a lateral position of the guide 320. That is, the winding state sensors may detect the amount of winding on the drum by detecting a position of the guide. Conveniently, since the guide 320 moves laterally along the drum 302 as the mechanical wire 102 is wound about the drum, the position of the guide 320 is indicative of the amount of winding and thus the amount of retraction and extension.

In the illustrated example of FIG. 3, the cable management system 300 includes a plurality of winding state sensors. For example, the cable management system 300 may includes a first terminal position sensor 502 and a second terminal position sensor 504. The first terminal position sensor 502 is configured to detect when the drum 302 is fully wound or is almost fully wound and the second terminal position sensor 504 is configured to detect when the drum 302 is fully unwound or is almost fully unwound. In at least some implementations, these terminal position sensors 502, 504 may detect when the guide 320 is at a terminal position. For example, the first terminal position sensor 502 may detect when the guide 320 is at a first terminal position and the second terminal position sensor 504 may detect when the guide 320 is at a second terminal position. The first terminal position is a position at which the drum 302 is fully wound or almost fully wound and the second terminal position is a position at which the drum 302 is fully unwound or almost fully unwound.

In at least some implementations, the terminal position sensors 502, 504 may be optical sensors. An example position of such sensors is illustrated in FIG. 3, which illustrates the rear side of a circuit board on which these sensors are mounted. The sensing element of the sensors is directed towards the rear of the cable management system 300 in the example. That is, it may be directed towards the side at which the guide 320 passes these sensors. Where the terminal position sensors 502, 504 are optical sensors, they may operate by shining a beam of light which may be broken when the guide 320 obstructs the beam of light. When the beam of light is broken, the sensor may determine that the guide 320 is in front of the sensor.

In some implementations, the terminal position sensors 502, 504 may be sensors of another type. For example, they may be magnetic sensors which sense the presence of a magnet and a magnet may be mounted on the guide 320. For example, the guide may include a magnet mounted on a surface at a position that allows the magnet to be sensed by the magnetic sensor when the guide is proximate the magnetic sensor. When a magnet is detected by the magnetic sensor, it may determine that the guide 320 is positioned in front of the sensor.

The use of the guide 320 for sensing purposes will operate even in implementations in which the guide does not operate as a guide that facilitates winding of the wire on the drum 302. The guide may also be referred to as a carriage.

The winding state sensors may also include one or more intermediate position sensors 506. Such sensors may be positioned to detect when the guide 320 is at a position that is not at or near the terminal positions. Put differently, such sensors may be positioned to detect when the guide 320 is at an intermediate position, which may be a position between the terminal positions. In the illustrated example, the winding state sensors include two lines of eight sensors each. These sensors may be, for example, magnetic sensors or optical sensors.

The terminal position sensors and the winding state sensors may be electrically coupled to the drive system. For example, the sensors may be coupled to a controller that controls the motor that drives the drum so that the controller may adjust an operating state of the drum based on output of the sensor(s). For example, the controller may stop the winding when the first terminal position sensor 502 detects the presence of the guide 320. By way of further example, the controller may stop the unwinding when the second terminal position sensor 504 detects the presence of the guide 320. By way of further example, the controller may adjust a speed of the winding based on a detected position of the guide at one or more of the intermediate position sensors 506.

Figure 9:
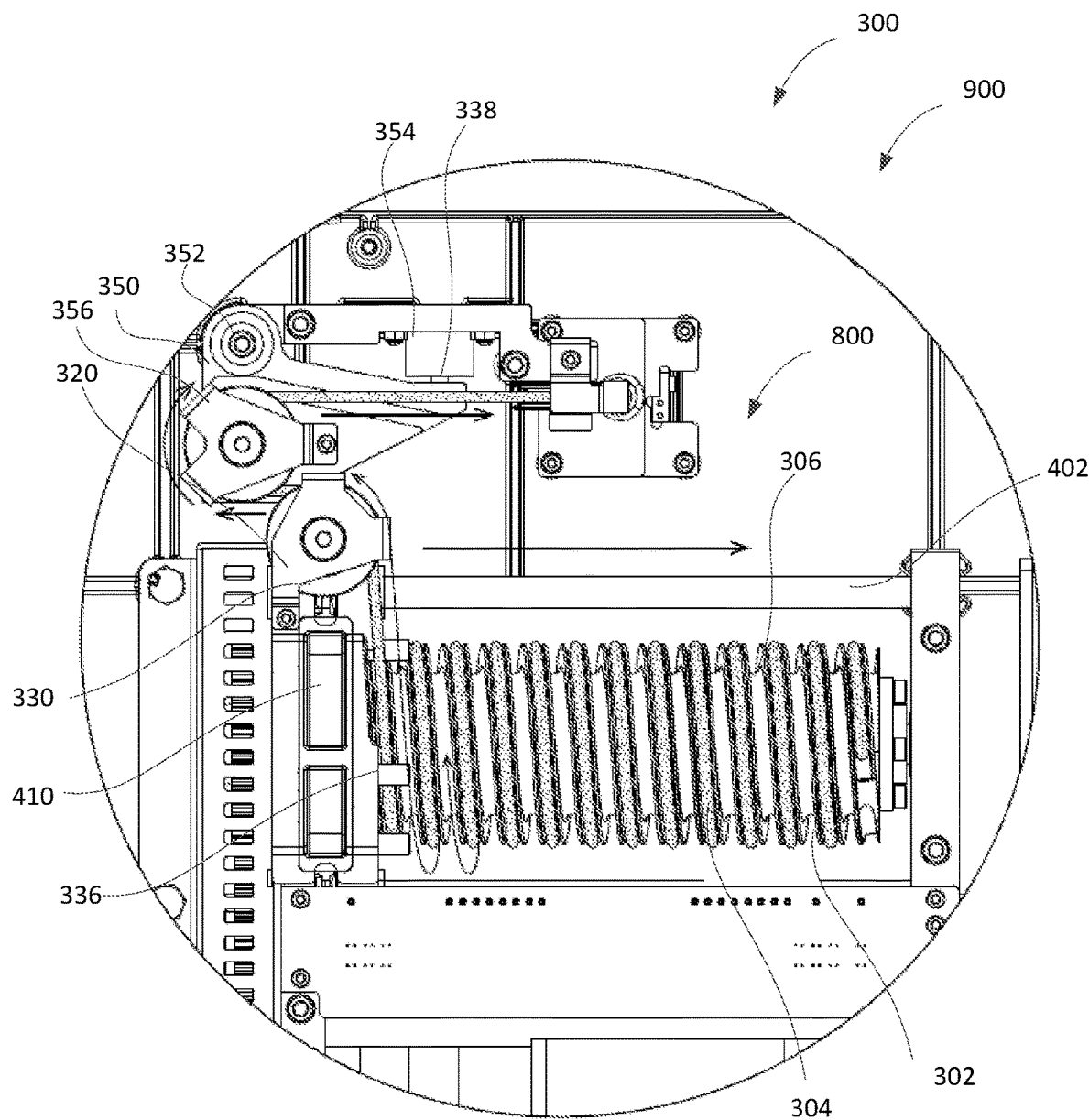
FIG. 9 is a detailed view of a region of the front elevational view of the cable management system of FIG. 3 showing a cable guide when a mechanical wire is substantially retracted.

The components of the cable management system 300 such as those illustrated, for example, in FIG. 9 may form a wire tension sensor 900. The wire tension sensor 900 may, in some implementations, be used with other systems apart from the cable management system 300 and/or electric vehicle charging system. For example, a wire tension sensor may include a transfer lever 350, which may be of the type described above and a load cell or other sensor 338 of the type described above. A force transmission coupler 356 of the type described above may be connected to the transfer lever 350 as described above.

In some implementations, the wire tension sensor 900 may include a controller which may be configured as described herein. For example, the controller may be configured to generate a control signal to control a wire retractor based on an output of a sensor, such as a load cell to cause the mechanical wire 102 to be selectively retracted into or extended from an enclosure 110 based on a sensor output. That is, the output of the load cell or other sensor 338 may be used to cause the mechanical wire 102 to be retracted or extended. When the load cell or other sensor 338 output indicates that an operator 108 is exerting a pulling force on a charging cable 150 coupled to the mechanical wire 102, the controller may generate a control signal that causes extension of the mechanical wire. When the sensor output indicates that an operator 108 is pushing on the charging cable 150 to help retract it and/or when it indicates that the operator 108 has removed the charging cable from a charging port of an electrical vehicle after charging completion, the controller may generate a control signal that causes retraction of the mechanical wire 102. The mechanical wire may, as described above, be coupled to a charging cable associated with the electronic vehicle charger.

In one implementation, a wire tension sensor 900 may generate an output based on a force upon a mechanical wire 102. In some instances, the wire tension sensor may include the transfer lever 350. The transfer lever 350 may be pivotably mounted in an enclosure 110 at a pivot point 352 as generally described above.

The wire tension sensor 900 may include a load cell or other sensor 338. The load cell or other sensor 338 may be mounted in alignment with a portion of the transfer lever that is spaced apart from the pivot point so that it is activated as the transfer lever 350 rotates. The load cell or other sensor 338 may be mounted to allow the load cell or other sensor to be inactivated when the transfer lever is in a first position or orientation and activated when the transfer lever is in a second position or, in some implementations, the load cell or other sensor may be mounted to allow the load cell or other sensor to be activated to a greater degree when the transfer lever is in the second position than when in the first position or orientation. That is, the load cell or other sensor may be mounted so that a higher force is transmitted to the load cell when the transfer lever is in the second position or orientation than in the first position or orientation. In some implementations, the load cell may be mounted beneath the transfer lever.

The wire tension sensor 900 may include a force transmission coupler 356. The force transmission coupler 356 may be as described above. For example, the force transmission coupler 356 may be connected to the transfer lever at a portion of the transfer lever that is in spaced relation to the pivot point. The force transmission coupler 356 may be configured for receiving a mechanical wire 102 and transmitting at least a portion of a force applied to the mechanical wire 102 to the transfer lever 350 to cause the transfer lever 350 to pivot from the first position or orientation to the second position or orientation to activate the sensor 338 to a greater extent by applying a greater amount of force or pressure to the sensor 338. The force transmission coupler may include a pulley connected to the transfer lever.

The wire tension sensor 900 which engages the mechanical wire 102 may generate a sensor output. The sensor output may be based on the force or load applied to the mechanical wire 102. That is, the sensor output may reflect an amount of external force or load that has been applied to the mechanical wire 102; for example, when an operator pulls on the charging cable 150. The sensor output may generate such an output using the sensor 338. For example, the output of the sensor 338 may be considered the output of the wire tension sensor 900.

The wire tension sensor 900 may include or be connected to a controller. For example, the output of the wire tension sensor 900 may be provided to the controller. The controller may be configured to generate a control signal to control a wire retractor based on an output of the load cell to cause the mechanical wire to be selectively retracted into or extended from the enclosure based on the load cell output. For example, the controller may control the wire retractor based on an amount of force applied to the mechanical wire, as sensed by the wire tension sensor. The wire retractor may be as described above. For example, the wire retractor may include a motor. The motor may be electrically connected to the controller.

In at least some implementations, the cable management system may be a carriage-based cable management system instead of a winch-based system. An example carriage-based cable management system will now be described with reference to FIGS. 13 to 20.

Referring now to FIGS. 13 to 20, an example cable management system 1300 is illustrated. The cable management system 1300 may also be referred to as a cable retraction system. The cable management system 1300 may operate to extend and/or retract a mechanical wire 102 to aid in management of a charging cable 150, 152 (FIG. 1).

The cable management system 1300 may include the enclosure 110 (FIG. 1) or a portion thereof and other portions of the cable management system 1300 may be provided within the enclosure. In at least some implementations, the enclosure 110 may enclose an electric vehicle charger. For example, the enclosure may house charging components of the electric vehicle charger. In at least some implementations, the cable management system 1300 may be provided within the support 190.

The cable management system 1300 includes a wire retractor 1314 which is configured to retract and extend the mechanical wire. In the illustrated example, the wire retractor includes a carriage 1316. More particularly, in the illustrated example, the cable management system 1300 retracts and extends the mechanical wire 102 through movement of a carriage 1316. The carriage 1316 may be situated within the enclosure 110. For example, the carriage 1316 may be situated within the support 190. The carriage 1316 may be vertically movable. That is, the carriage 1316 may be raised and lowered or otherwise moved to retract or extend the mechanical wire 102. The carriage 1316 may be moved in one direction (e.g., raised) to extend the mechanical wire 102 and moved in other direction (e.g., lowered) to retract the mechanical wire 102.

As noted above, the mechanical wire 102 may be coupled to a charging cable 150, 152 associated with the electric vehicle charger at one end so that movement of the mechanical wire 102 aids in extending and retracting the charging cable 150, 152. Upward movement of the carriage 1316 aids in extending the charging cable while downward movement aids in retracting the charging cable.

The carriage 1316 may include one or more weights 1324 which bias the carriage 1316 to allow the mechanical wire 102 to remain taught within the enclosure so that the mechanical wire does not have excess slack. Excess slack within the enclosure could, in some implementations, cause the mechanical wire 102 from shifting off a track. The track may be defined, for example, by one or more pulleys. Pulleys may be used to allow the mechanical wire 102 to have multiple windings between the carriage and another fixed position within the enclosure so that movement of the carriage results in a corresponding but multiplied movement of the mechanical wire outside of the enclosure. For example, the pulleys may allow the mechanical wire to move at two, three, four or five or more times the amount of movement of the carriage and the specific ratio will depend on the number of pulleys used.

In some implementations, the weights 1324 and the carriage 1316 may not be separate components. Rather, the carriage 1316 may be a weighted carriage that has sufficient weight to prevent the carriage 1316 from drifting upwardly without the application of an external force, such as a motor. Accordingly, in some implementations, the carriage may include or be coupled to a weight for downwardly biasing the carriage.

The carriage 1316 may travel on a rail 1322 or other guide. The rail 1322 or other guide may control movement of the carriage 1316 within the enclosure 110. In the illustrated example, the rail 1322 or other guide only allows the carriage 1316 to travel up or down. That is, the rail 1322 or guide may prevent lateral movement such as swaying of the carriage 1316.

The wire retractor 1314 provided in the cable management system 1300 may include a motor 1306. The carriage 1316 may be movable by the motor 1306. That is, the motor 1306 may cause the carriage 1316 to move within the enclosure 110. The motor 1306 may move the carriage 1316 between a first terminal position 1330 and a second terminal position 1332. When the carriage is in the first terminal position, the mechanical wire 102 is extended from the enclosure by a greater amount than when the carriage is in the second terminal position. The first terminal position 1330 may be relatively higher than the second terminal position 1332. The first terminal position 1330 may be an uppermost position of the carriage. The second terminal position 1332 may be a lowermost position of the carriage. The lowermost position of the carriage may be at or near a lower support 1350.

The wire retractor 1314 provided in the cable management system 1300 may include one or more wire receivers for receiving the mechanical wire. For example, a coupler 1318 may be connected to or provided on the carriage 1316 for receiving the mechanical wire 102. In the illustrated example, the coupler 1318 is a mechanical disconnect that is configured to mechanically release the mechanical wire from the carriage when a force greater than a threshold is applied to the mechanical wire. That is, the mechanical disconnect will release the mechanical wire 102 to detach it from the carriage 1316 when the mechanical wire is pulled with too large a force. The mechanical disconnect may be designed with an integrated break point. For example, the mechanical disconnect may include a breaking feature which causes the mechanical wire to be automatically cut or to be released when it is pulled with too great a force. The mechanical disconnect may protect the wire retractor 1314 from damage if, for example, the mechanical wire 102 gets caught on something.

The wire retractor 1314 may include a carriage motivator which is, in the example, a motor 1306. The motor 1306 may be electrically connected to a controller and may move the carriage in response to a signal received from the controller. That is, controller may control movement of the motor 1306.

The wire retractor 1314 may include a leadscrew which couples the motor 1306 to the carriage 1316. The leadscrew may be rotated by the motor to cause the carriage to be raised or lowered and the direction of movement of the leadscrew may be controlled by the controller. In this way, the controller may selectively raise or lower the leadscrew.

The wire retractor 1314 may, in some implementations, be of another type apart from that described above. For example, in one implementation, the wire retractor 1314 may be or include a winch which retracts the mechanical wire 102 by winding of the mechanical wire 102. The controller may be electrically connected to the wire retractor 1314 irrespective of the form of the wire retractor so that the wire retractor is controlled by the controller.

The controller may also be electrically connected to a sensor 1308. The sensor 1308 is configured to sense an external force or load applied to the mechanical wire 102 such as a force or load applied by an operator 108 indirectly to the mechanical wire 102 through pulling of a charging cable coupled to the mechanical wire 102. For example, the sensor 1308 may be configured to sense a tension applied to the mechanical wire 102. The controller receives a sensor output from the sensor and then selectively controls the wire retractor based on a sensor output of the sensor 1308. More particularly, the controller may cause the wire retractor to selectively retract or extend the mechanical wire from the enclosure based on the sensor output to selectively apply a force to the charging cable.

The controller may, for example, be configured to determine, based on the sensor output, when an operator is pulling on the charging cable 150, 152. In response to determining that an operator is pulling on the charging cable, the controller may activate the wire retractor 1314 to extend the mechanical wire 102. The controller may, additionally or alternatively, be configured to determine that the mechanical wire should be retracted based on, for example, determining that the charging cable has been disconnected from an electric vehicle. Upon detecting such a condition, the controller may activate the wire retractor 1314 to retract the mechanical wire 102. In some implementations, the controller may detect other conditions based on the sensor or other output. For example, the controller may detect when the charging cable has been plugged into an EV and, in response, it may lock the wire retractor 1314. Locking the wire retractor may prevent a force from being applied to the port of the EV, which may damage the port.

The sensor 1308 may be or include a load cell or a pressure sensor. The cable management system 1300 may include a transfer lever 1302 which transfers a force applied to the mechanical wire to a force on the transfer lever 1302. The transfer lever 1302 may be pivotally mounted in the enclosure at a pivot point 1312. That is, the transfer lever 1302 may rotate about a pivot point 1312. The transfer lever 1302 may be rotatable about the pivot point to selectively active or inactive the sensor 1308. For example, the sensor 1308 may be activated when the transfer lever 1302 is in a first position or orientation or deactivated (or activated to a lesser extent) when the transfer lever 1302 is in a second position or orientation. Put differently, the sensor 1308 may have a larger force applied to it by the transfer lever 1302 when the transfer lever 1302 is in a first position or orientation than when it is in a second position or orientation. That is, the sensor 1308 may have a larger force applied to it by the transfer lever 1302 when the mechanical wire 102 is pulled by an operator than when it is not pulled by an operator.

The sensor 1308 may be mounted within the enclosure 110. In some implementations, the sensor 1308 may be mounted beneath the transfer lever 1302. The sensor 1308 may be aligned with a portion of the transfer lever 1302 that is in spaced relation to the pivot point 1312. That is, the sensor 1308 is mounted at a portion of the transfer lever 1302 that does not align with the pivot point 1312 so that movement of the transfer lever 1302 about the pivot point 1312 causes the sensor 1308 to be activated. In the example illustrated, the sensor 1308 is mounted on a support 1362. The support holds the sensor 1308 in a fixed position. That is, in the illustrated example, the sensor 1308 does not move.

The transfer lever 1302 is configured to be moved to transmit a force that is applied to the mechanical wire 102. In order to translate a force on the mechanical wire 102 into movement of the transfer lever 1302, the cable management system 1300 may include a force transmission coupler 1310. The force transmission coupler 1310 is, in the illustrated example, a pulley. The pulley may be connected to the transfer lever 1302. The pulley or other force transmission coupler 1310 receives the mechanical wire 102 and transmits at least a portion of a force applied to the mechanical wire 102 to the transfer lever 1302 to cause the transfer lever 1302 to pivot. The pulley or other force transmission coupler 1310 may be connected to the transfer lever 1302 at a portion of the transfer lever 1302 that is in spaced relation to the pivot point 1312. That is, the force transmission coupler 1310 is away from the pivot point 1312 so that a force applied to the force transmission coupler 1310 by the mechanical wire 102 induces transmission of the force, for example, through a slight rotational movement of the force transmission coupler 1310. A force applied to the mechanical wire 102 to the transfer lever 1302 may, for example, cause the transfer lever 1302 to pivot by a small amount from the first position or orientation to the second position or orientation to activate the sensor 1308 to a greater extent by applying a greater amount of pressure to the sensor.

The force transmission coupler 1310 is, in the illustrated example, a pulley mounted in a recess 1364 of the transfer lever 1302. In other implementations, the force transmission coupler 1310 may take other forms. For example, in one implementation, the force transmission coupler 1310 may fixedly connect the mechanical wire 102 to the transfer lever 1302. In one implementation, rather than having the mechanical disconnect on the carriage 1316, it may instead be provided on the transfer lever 1302.

Figure 17:
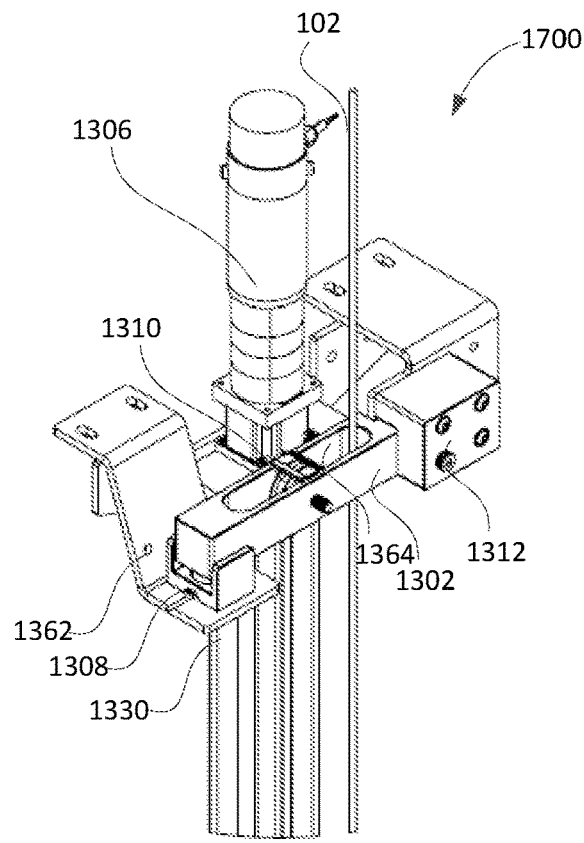
FIG. 17 is a detailed view of a region A of the perspective view of the cable management system of FIG. 13.
Figure 18:
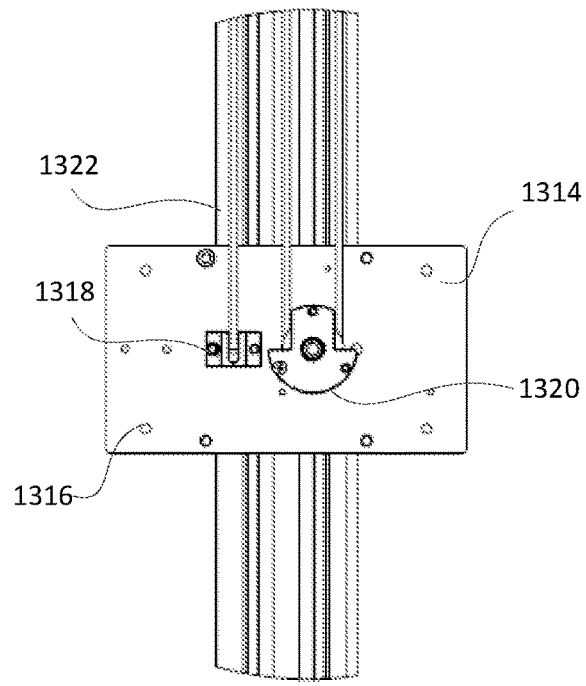
FIG. 18 is a detailed view of a region B of the front elevational view of the cable management system of FIG. 14.
Figure 19:
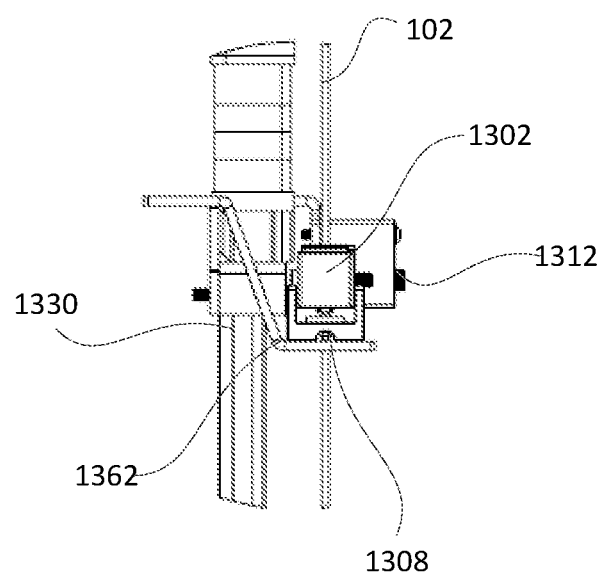
FIG. 19 is a detailed view of a region C of the left side elevational view of the cable management system of FIG. 15.
Figure 20:
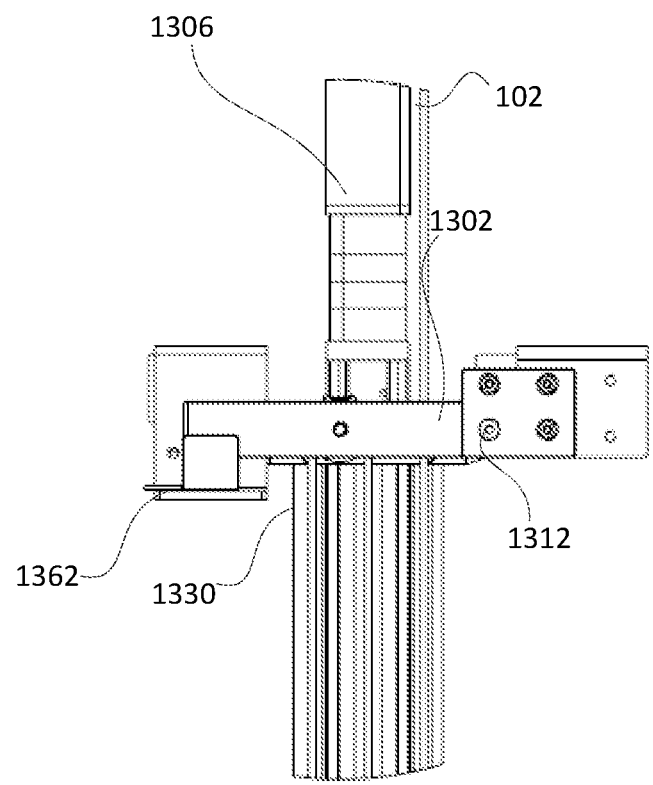
FIG. 20 is a detailed view of a region D of the front elevational view of the cable management system of FIG. 14.

The present application also contemplates a wire tension sensor 1700 which may best be illustrated in FIG. 17. The wire tension sensor 1700 uses a transfer lever 1302, which may be of the type described above and a load cell or other sensor 1308 of the type described above. A force transmission coupler 1310 of the type described herein may be connected to the transfer lever as described above. In some implementations, the wire tension sensor 1700 may include a controller which may be configured as described above. For example, the controller may be configured to generate a control signal to control a wire retractor 1314 based on an output of the load cell to cause the mechanical wire 102 to be selectively retracted into or extended from an enclosure 110 based on a load cell output. That is, the output of the load cell or other sensor 1308 may be used to cause the mechanical wire 102 to be retracted or extended. When the load cell or other sensor 1308 output indicates that an operator 108 is exerting a pulling force on a charging cable 150 coupled to the mechanical wire 102, the controller may generate a control signal that causes extension of the mechanical wire. When the charger indicates that an operator 108 has removed the charging cable from a charging port of an electrical vehicle after charging completion, the controller may generate a control signal that causes retraction of the mechanical wire 102. The mechanical wire may, as described above, be coupled to a charging cable associated with the electronic vehicle charger.

In one implementation, a wire tension sensor 1700 may generate an output based on a force upon a mechanical wire 102. In some instances, the wire tension sensor 1700 may include the transfer lever 1302. The transfer lever 1302 may be pivotably mounted in an enclosure 110 at a pivot point 1312 as generally described above.

The wire tension sensor 1700 may include a load cell or other sensor 1308. The load cell or other sensor 1308 may be mounted in alignment with a portion of the transfer lever that is spaced apart from the pivot point so that it is activated as the transfer lever 1302 receives a torque from pulling of the mechanical wire. That is, the load cell or other sensor 1308 may be mounted to be activated as the transfer lever rotates slightly. The load cell or other sensor may be mounted to allow the load cell or other sensor to be inactivated when the transfer lever is in a first orientation and activated when the transfer lever is in a second orientation or, in some implementations, the load cell or other sensor may be mounted to allow the load cell or other sensor to be activated to a greater degree when the transfer lever is in the second orientation than when in the first orientation. In some implementations, the load cell may be mounted beneath the transfer lever 1302.

The wire tension sensor 1700 may include a force transmission coupler 1310. The force transmission coupler 1310 may be as described above. For example, the force transmission coupler 1310 may be connected to the transfer lever 1302 at a portion of the transfer lever that is in spaced relation to the pivot point 1312. The force transmission coupler 1310 may, in some implementations, fixedly connect the mechanical wire 102 to the transfer lever. The force transmission coupler 1310 may be configured for receiving a mechanical wire 102 and transmitting at least a portion of a force applied to the mechanical wire 102 to the transfer lever 1302 to cause the transfer lever 1302 to pivot from the first orientation or position to the second orientation or position to activate the sensor 1308 to a greater extent by applying a greater force or pressure to the sensor 1308. The force transmission coupler 1310 may include a pulley connected to the transfer lever 1302. In some implementations, the force transmission coupler 1310 may include a mechanical disconnect (see, e.g., the first coupler 1318). The mechanical disconnect may be configured to mechanically release the mechanical wire 102 from the transfer lever 1302 when a force greater than a threshold is applied to the mechanical wire 102.

The wire tension sensor 1700 which engages the mechanical wire 102 may generate a sensor output. The sensor output may be based on the force or load applied to the mechanical wire 102. That is, the sensor output may reflect an amount of external force or load that has been applied to the mechanical wire 102; for example, when an operator pulls on the charging cable 150. The sensor output may generate such an output using the sensor 1308. For example, the output of the sensor 1308 may be considered the output of the wire tension sensor 1700.

The wire tension sensor 1700 may include or be connected to a controller. For example, the output of the wire tension sensor 1700 may be provided to the controller. The controller may be configured to generate a control signal to control a wire retractor based on an output of the load cell to cause the mechanical wire to be selectively retracted into or extended from the enclosure based on the load cell output. The wire retractor may be as described above. For example, the wire retractor may include a motor 1306. The motor 1306 may be electrically connected to the controller. The wire retractor may also include a carriage 1316. The carriage 1316 may be coupled to a leadscrew. The carriage may be movable within the enclosure between a first terminal position and a second terminal position. The wire retractor may also include a coupler 1318, 1320. The coupler 1318, 1320 may be connected to the carriage 1316 for receiving the mechanical wire 102.

In some implementations, when the carriage 1316 is in the first terminal position, the mechanical wire 102 is extended from the enclosure by a greater amount than when the carriage 1316 is in the second terminal position.

While not illustrated in FIGS. 13 to 20, the cable management system 1300 may include one or more retraction and/or extension state sensors, such as winding state sensors. The winding state sensors may include, for example, terminal position sensors and/or intermediate position sensors. Such sensors may be of the type described above with reference to the cable management system 300 of FIGS. 3 to 12.

Figure 21:
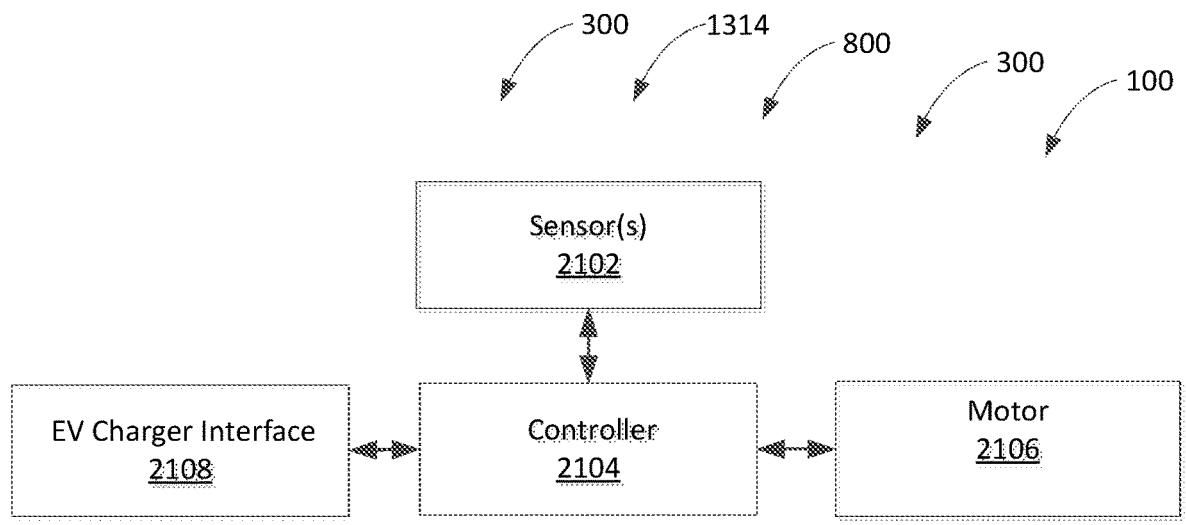
FIG. 21 is a block diagram of an example cable management system in accordance with example embodiments of the present disclosure.

Reference will now be made to FIG. 21 which is a schematic diagram illustrating example components of a wire retractor 800, 1314 and/or an EV charging station 100 and/or a cable management system 300, 1300. For example, the schematic diagram may be one of wire retractor 800, 1314 and/or an EV charging station 100 and/or a cable management system 300, 1300 referred to above.

A controller 2104 may control the wire retractor 800, 1314 and/or an EV charging station 100 and/or a cable management system 300, 1300. For example, the controller 2104 may control the wire retraction components of such systems. The controller 2104 is communicably coupled to the wire retractor 800, 1314. In this way, the controller 2104 controls the wire retractor 800, 1314. For example, the controller 2104 may cause the wire retractor 800, 1314 to selectively control the wire retractor 800, 1314 based on a sensor output of one or more sensors 2102. The controller 2104 may be communicably coupled with one or more of the sensor(s) 2102. These sensors 2102 may be or include, for example, the sensor 338, 1308 that operates as a wire tension sensor. For example, the sensors 2102 may include a load cell which generates a sensor output based on a force applied to the charging cable 150 coupled to the mechanical wire 102. The sensors 2102 connected to the controller 2104 may be or include one or more winding state sensors. The winding state sensors may sense the amount of winding and/or unwinding of the mechanical wire 102. For example, the winding state sensors may be of a type described above including, for example, the first terminal position sensor 502, the second terminal position sensor 504 and/or one or more intermediate position sensors 506. The sensors 2102 coupled to the controller 2104 may be or include optical sensors and/or magnetic sensors. The sensors 2102 may include sensors of other types.

The controller 2104 may cause the wire retractor 800, 1314 and/or an EV charging station 100 and/or a cable management system 300, 1300 to selectively retract or extend the mechanical wire 102 from an enclosure 110 based on the sensor output of one or more of the sensors 2102. For example, the controller 2104 may control wire retraction and extension by generating a control signal that controls a wire retractor 800, 1314 and/or an EV charging station 100 and/or a cable management system 300, 1300 based on the output of one or more of the sensors. For example, the controller 2104 may control the wire retractor 800, 1314 and/or an EV charging station 100 and/or a cable management system 300, 1300 based on an output of the load cell or other sensor to cause the mechanical wire 102 to be selectively retracted into or extended from the enclosure based on the load cell or other sensor output. By controlling the retraction and extension of the mechanical wire 102 from the enclosure based on the sensor output, the controller 2104 selectively applies a force to the charging cable 150. For example, by retracting the mechanical wire 102, the controller 2104 may apply a pulling force to the charging cable 150. This pulling force may pull the charging cable 150 upward so that the charging cable is away from the ground. By extending the mechanical wire 102, the controller 2104 causes the charging cable 150 to be lowered or otherwise extended.

The wire retractor 800, 1314 and/or an EV charging station 100 and/or a cable management system 300, 1300 may include a motor 2106. The motor may be one or more of the motors 342, 1306 described above.

The controller 2104 may also be coupled to an EV charger interface 2108 that allows the controller 2104 to send data to or receive data from a controller or processor associated with an EV charger. For example, the EV charger interface 2108 may allow the controller 2104 to access charger state data. Charger state data may indicate a state of the charger. For example, the charger state data may indicate a state associated with a connector 160, 162. For example, it may indicate whether the connector 160, 162 is plugged into an electric vehicle and/or whether the connector 160, 162 is plugged into a holster 180 associated with the EV charger. Additionally or alternatively, the charger state data may indicate a charging state associated with the EV charger. For example, the charger state data may indicate whether the EV charger is charging or whether it is not currently charging. The charger state data may include data of another type. Additionally or alternatively, the charger state data may indicate whether an operator has authenticated to the EV charger. For example, prior to use, the operator may be required to authenticate to the EV charger. Authentication may be performed by determining that an operator and/or an electric vehicle is associated with a particular account and/or by processing a payment. For example, the operator may be said to be authenticated when a pre-authorization for a payment has been performed.

Figure 22:
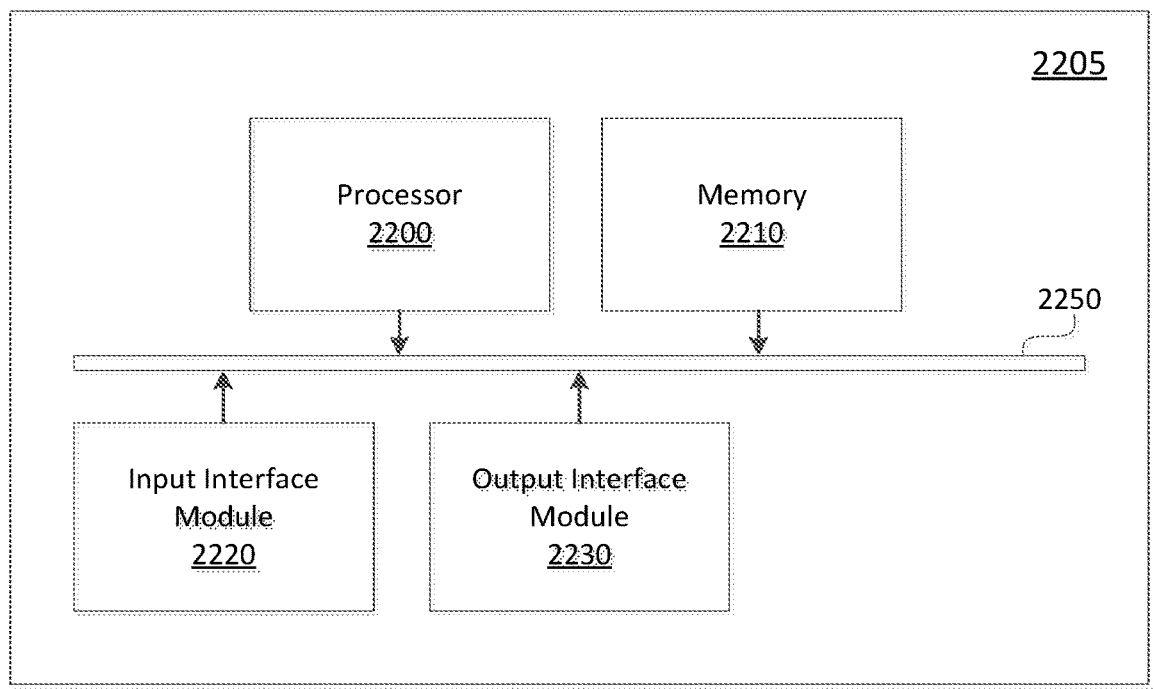
FIG. 22 is a block diagram of an example computing device in accordance with example embodiments of the present disclosure.

Reference will now be made to FIG. 22, which is a high-level operation diagram of an example computing device 2205. In at least some embodiments, the example computing device 2205 may be exemplary of the controller 2104. The computing device 2205 includes a variety of modules. For example, the example computing device 2205, may include a processor 2200, a memory 2210, an input interface module 2220, and an output interface module 2230. As illustrated, the foregoing example modules of the example computing device 2205 may be in communication over a bus 2250.

The processor 2200 may be a hardware processor and may, for example, be one or more ARM, Intel x86, PowerPC processors or the like. Controllers of other types such as field programmable gate array (FPGA) controllers are also contemplated. The processor 2200 may, in some implementations, be provided as a single chip and, in other implementations, may be provided as a circuit having multiple components. For example, the processor 2200 may be or include a printed circuit board (PCB) or a portion of a printed circuit board. In at least some implementations, the processor 2200 may be or may be provided on the control circuit 384 (FIG. 3).

The memory 2210 allows data to be stored and retrieved. The memory 2210 may include, for example, random access memory, read-only memory, and persistent storage. Persistent storage may be, for example, flash memory, a solid-state drive or the like. Read-only memory and persistent storage are a computer-readable medium.

The input interface module 2220 allows the example computing device 2205 to receive input signals. Input signals may, for example, correspond to input received from one or more of the sensors described herein, or from other sensors. That is, the input interface modules 2220 may be coupled to one or more of the sensors. In some implementations, the computing device 2205 may include multiple input interface modules 2220. For example, each sensor that is included may be coupled to a different input interface module 2220. In some implementations, the input interface modules 2220 may be or include connectors such as pins or pads associated with an electrical component, such as a chip.

The output interface module 2230 allows the example computing device 2205 to provide output signals. Some output signals may, for example, control the motor 2106. The output interface module 2230 may also be referred to as a controller output. The output interface module 2230 may be or include multiple output interface modules. In some implementations, the output interface modules 2230 may be or include connectors such as pins or pads associated with an electrical component, such as a chip.

In at least some implementations, the motor 2106 may be a direct current (DC) motor. In at least some implementations, the motor 2106 may be controlled by the controller 2104 in any one of the following ways: starting the motor after the motor has been stopped, stopping the motor after it has been started, changing a direction of rotation of the motor, varying a speed of the motor. In at least some implementations, the speed of the motor may be controlled by regulating the amount of voltage across terminals associated with the motor 2106. This may be performed, for example, through pulse width modulation (PWM).

Processor and/or computer-executable instructions may be executed by the processor 2200. Such instructions may be stored in a computer-readable medium. For example, the instructions may be stored in the memory 2210. The instructions may, in some implementations, be or include software.

Figure 23:
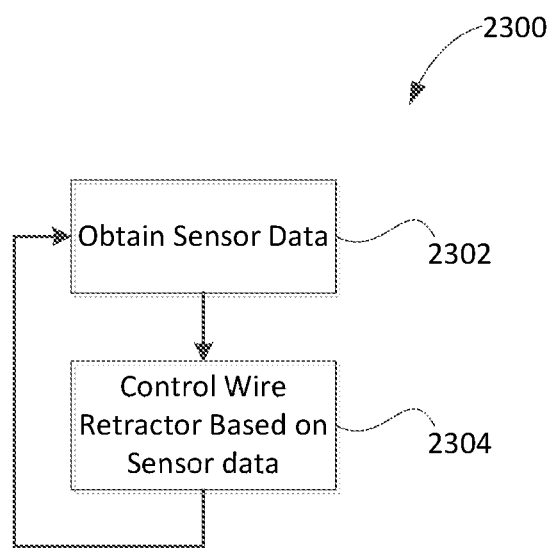
FIG. 23 is a flowchart of an example method of controlling a wire retractor based on sensor data in accordance with example embodiments of the present disclosure.

Reference is now made to FIG. 23, which shows, in flowchart form, an example method 2300 for controlling a wire retractor 800, 1314 and/or an EV charging station 100 and/or a cable management system 300, 1300. The method 2300 may be implemented by a controller of a wire retractor 800, 1314 and/or an EV charging station 100 and/or a cable management system 300, 1300, such as the controller 2104 of FIG. 22. The controller 2104 may be configured to perform the method 2300 by computer and/or processor-executable instructions. Such instructions may be stored in a memory 2210. The instructions may cause one or more of the processor 2200, the controller 2104, the wire retractor 800, 1314, the EV charging station 100 and/or the cable management system 300, 1300 to perform the method 2300.

At an operation 2302, the controller 2104 obtains sensor data from one or more sensors 2102 (FIG. 21). These sensors 2102 may be or include, for example, the sensor 338, 1308 that operate as wire tension sensors. Accordingly, at the operation 2302, the controller 2104 may obtain sensor data from the wire tension sensor. For example, the sensors 2102 may include a load cell which generates a sensor output based on a force applied to the charging cable 150 coupled to the mechanical wire 102. Additionally or alternatively, the controller 2104 may, at the operation 2302, obtain sensor data from one or more winding state sensors. The winding state sensors may sense the amount of winding and/or unwinding of the mechanical wire 102. For example, the winding state sensors may be of a type described above including, for example, the first terminal position sensor 502, the second terminal position sensor 504 and/or one or more intermediate position sensors 506. The controller 2104 may, in at least some implementations, at the operation 2302, obtain sensor data from one or more optical sensors and/or magnetic sensors. The controller 2104 may obtain data from other types of sensors apart from those described above. The sensor data may be or include a sensor output such as a sensor reading.

Next, at an operation 2304, the controller 2104 controls a wire retractor 800, 1314 and/or an EV charging station 100 and/or a cable management system 300, 1300 based on an amount of force applied to the mechanical wire. For example, the instructions may cause the wire retractor 800, 1314 and/or an EV charging station 100 and/or a cable management system 300, 1300 to extend the mechanical wire 102 from the enclosure 110 in response to detecting a pulling force applied to the mechanical wire 102. That is, when the controller 2104 determines, based on sensor data which may be obtained from a wire tension sensor, such as a load cell-based sensor such as the sensor 338 of FIG. 3 or the sensor 1308 of FIG. 13, that the mechanical wire 102 has been pulled, then the controller 2104 may, in at least some implementations, cause the mechanical wire 102 to be extended from the enclosure 110. The controller 2104 may cause the mechanical wire 102 to be extended by controlling a motor 2106. For example, the motor 2106 may rotate a drum 302 (FIG. 3) or move a carriage (FIG. 13) in order to cause the extension of the mechanical wire 102.

In some implementations, the extension may only be performed if one or more preconditions are satisfied. That is, in some operating states, a detected pull alone may be insufficient to cause the extension. Rather, one or more other preconditions must be detected or determined to exist by the controller 2104 before the controller 2104 will cause the extension. For example, it may be that the extension is performed when the controller 2104 first determines that the mechanical wire 102 is not already fully extended. This determination may be made based on sensor data from another sensor such as, for example, one or more of the winding state sensors. The winding state sensors may sense the amount of winding and/or unwinding of the mechanical wire 102. The winding state sensors may be or include one or more of: the first terminal position sensor 502, the second terminal position sensor 504 and/or one or more intermediate position sensors 506. Additionally or alternatively, the one or more preconditions that must be detected may be or include one or more particular states defined in state definition data. The state definition data may be stored in memory, for example. For example, the controller 2104 may operate in various operating states and extension of the mechanical wire 102 may only be permitted in some operating states. By way of example, in at least some implementations, extension may be permitted when the controller 2104 is operating in an idle or authorization received state but it may not be possible when the state definition data indicates that the mechanical wire 102 has already been fully extended.

Another example of a precondition that may be required in some implementations before the controller 2104 initiates the extension of the mechanical wire 102 may be based on a force or load threshold. For example, in at least some implementations, the controller 2104 must determine that the amount of force or load exerted on the mechanical wire 102 exceeds a defined threshold. The threshold may be an amount of force or load that is greater than zero. The threshold may be an amount of force or load that is at least a non-zero amount above a resting force or load. The resting force or load may be based on the sensor output of the sensor 338, 1308 when no external force is applied to the charging cable 150 or the mechanical wire 102. That is, it may be based on the load as measured on a sensor that has been tared to account for the resting weight. The resting force or load may be determined anew each time the mechanical wire 102 is fully retracted since this force may vary based on the factors such as whether snow and ice has accumulated on the charging cable and/or positioning of the charging cable. In this way, the controller 2104 may determine whether a force/load is sufficient to initiate extending of the mechanical wire 102 relative to the resting force/load that was detected after the mechanical wire 102 was last fully retracted. Accordingly, the instructions may, when executed by the controller 2104, cause the wire retractor to extend the mechanical wire in response to detecting a load that is determined to be at least a threshold amount greater than a resting state load determined after a last full retraction of the mechanical wire 102.

Accordingly, in at least some implementations, the controller 2104 may compare sensor data from a sensor, such as the wire tension sensor, to a threshold. This threshold or comparison may be performed taking into account the resting force/load. Then, the controller may selectively control the wire retractor based on the result of the comparison. For example, the controller 2104 may send a control signal to the wire retractor based on the comparison. The control signal may activate the motor to extend the mechanical wire or, based on certain sensed conditions, to retract the mechanical wire.

When the controller 2104 controls the wire retractor to extend the mechanical wire, it may cause the mechanical wire to be extended at a rate that depends on an amount of force or the load applied to the mechanical wire 102. For example, the wire retractor may control a speed of the extending of the mechanical wire 102 and/or a speed of the retracting of the mechanical wire 102. The speed may be controlled by controlling a speed of the motor 2106 that causes such extension/retraction. The speed may be controlled such that a harder pull on the mechanical wire 102 results in a faster extension of the cable than a softer pull on the mechanical wire 102. Put differently, the controller may be configured, by the instructions, to cause the wire retractor to extend the mechanical wire at a first rate when a first amount of force is applied to the mechanical wire and at a different second rate when a second amount of force, that is different from the first amount of force, is applied to the mechanical wire.

In some implementations, the speed at which the motor is rotated may be determined by the controller 2104 based on a function of the detected force or load at the sensor 338, 1308. In some implementations, the speed may be determined based on comparisons of the sensor data or a load represented by such data to multiple thresholds. For example, the controller 2104 may send a control signal to extend the mechanical wire at a first speed when a load represented by the sensor data exceeds a first threshold and it may send the control signal to extend the mechanical wire at a second speed when a load represented by the sensor data exceeds a second threshold.

As illustrated in FIG. 23, the operations of the method 2300 may be performed repeatedly. For example, the controller 2104 may repeatedly obtain sensor data at the operation 2302 and control the wire retractor based on such sensor data at the operation 2304. For example, as detected conditions at the sensor(s) changes, the controller 2104 may change operation of the wire retractor.

In some implementations, the controller 2104 may be connected to an extension state sensor and/or a retraction state sensor such as a winding state sensor. For example, the controller 2104 may be coupled to and receive sensor data from the intermediate position sensor 506. In at least some implementations, at an iteration of the operation 2304, the controller 2104 may detect, based on sensor data from a winding state sensor such as an extension state sensor, that the wire retractor is in a particular state of extension. For example, it may detect that the wire retractor is nearing full extension of the mechanical wire 102. In response to detecting that the wire retractor is in the particular state of extension, the controller 2104 may reduce a speed of the wire retractor to slow extension of the wire.

In another example, the controller 2104 may detect, based on sensor data from a retraction state sensor, that the wire retractor is in a particular state of retraction and it may, in response, reduce a speed of the wire retractor to slow retraction of the wire. The particular state of retraction may be a state at which the wire retractor is nearing full retraction of the mechanical wire 102.

In at least some implementations, during an iteration of the operation 2304, the controller 2104 may control the wire retractor based on sensor data obtained from one or more terminal position sensors 502, 504. A first one of the terminal position sensors 502 may be used to detect when the mechanical wire 102 is fully retracted and a second one of the terminal position sensors 504 may be used to detect when the mechanical wire 102 is fully extended. In some implementations, the controller 2104 may detect, based on the sensor data from the second one of the terminal position sensors 504 that the mechanical wire 102 is fully extended and it may, in response, stop any further extension of the mechanical wire. For example, it may control the motor of the wire retractor to stop any further extension.

In some implementations, the controller 2104 may detect, based on the sensor data from the first one of the terminal position sensors 502 that the mechanical wire 102 is fully retracted and it may, in response, stop the retraction of the mechanical wire. For example, it may control the motor of the wire retractor to stop any further retraction.

The controller 2104 may control the wire retractor based on other data instead of or in addition to sensor data. For example, in at least some implementations, the method 2300 may include operations in which the controller 2104 receives charger state data and controls the wire retractor based on the charger state data. The controller may be coupled to an interface of an electric vehicle charger and may receive the charger state data through the interface.

Charger state data may indicate a state of the charger. For example, the charger state data may indicate a state associated with a connector 160, 162. For example, it may indicate whether the connector 160, 162 is plugged into an electric vehicle and/or whether the connector 160, 162 is plugged into a holster 180 associated with the EV charger. Additionally or alternatively, the charger state data may indicate a charging state associated with the EV charger. For example, the charger state data may indicate whether the EV charger is charging or whether the EV charger is idle. Additionally or alternatively, the charger state data may indicate whether an operator or electric vehicle has authenticated to the EV charger. For example, prior to use, the operator or electric vehicle may be required to authenticate to the EV charger. Authentication may be performed by determining that an operator and/or an electric vehicle is associated with a particular account and/or by processing a payment. For example, the operator or electric vehicle may be said to be authenticated when a pre-authorization for a payment has been performed. The charger state data may include data of another type.

In at least some implementations, at an iteration of the operation 2304 or during another operation (not illustrated) of the method 2300, the controller 2104 may control the wire retractor based on the charger state data by preventing extension of the mechanical wire by the wire retractor unless the charger state data indicates an authorized state indicating that an operator has been authorized to use the electric vehicle charger. That is, the controller 2104 may only permit the mechanical wire 102 to be extended from a retracted state when an operator successfully authenticates. For example, authentication may indicate that the operator or vehicle has been associated with a particular account or that a payment has been processed. In some implementations, prior to authentication, the controller 2104 may lock the wire retractor so that the mechanical wire 102 cannot be extended.

In at least some implementations, at an iteration of the operation 2304 or during another operation (not illustrated) of the method 2300, the controller 2104 may control the wire retractor based on the charger state data by controlling the wire retractor to stop extension of the mechanical wire when the charger state data indicates that a connector associated with the electric vehicle charger has been connected to a charging port of an electric vehicle. For example, when the wire retractor is being controlled by the controller 2104 to extend the mechanical wire 102 and the controller 2104 detects that the connector of the EV charger has been connected to the charging port of an electric vehicle, it may stop further extension of the mechanical wire. It may, for example, stop extension even if the mechanical wire is not fully extended. By only allowing enough mechanical wire 102 as is necessary to reach the charging port with the connector, the controller may keep the charging cable off of the ground as much as possible and/or may allow for a faster retraction later.

In at least some implementations, at an iteration of the operation 2304 or during another operation (not illustrated) of the method 2300, the controller 2104 may control the wire retractor based on the charger state data by locking the wire retractor in response to detecting that the charger state data indicates that a connector associated with the electric vehicle charger has been connected to a charging port of an electric vehicle. Locking the wire retractor may be performed by adjusting a state associated with the controller 2104 and/or by engaging a brake and/or by controlling a motor to engage a locking feature. The lock prevents any retraction of the mechanical wire until the lock is disengaged. By locking the wire retractor, the controller 2104 may avoid any negative affect on the charging port caused by inadvertent or pre-emptive retraction of the mechanical wire.

In at least some implementations, at an iteration of the operation 2304 or during another operation (not illustrated) of the method 2300, the controller 2104 may control the wire retractor based on the charger state data by initiating retraction of the mechanical wire when the charger state data indicates that a connector associated with the electric vehicle charger has been disconnected from a charging port of an electric vehicle. That is, after the connector is removed from the port on the electric vehicle, the mechanical wire 102 may be automatically retracted.

In at least some implementations, the controller 2104 may be configured to, during retraction, perform one or more operations in order to facilitate orderly retraction. For example, the controller 2104 may determine that retraction of the mechanical is impeded. This may involve determining that the mechanical wire 102 appears to be caught, snagged or obstructed. The controller 2104 may determine that retraction has been impeded using a variety of techniques. For example, in some implementations, determining that the retraction is impeded may be performed by detecting a motor overload on a motor associated with the wire retractor. That is, when the motor is overloaded, the controller 2104 may determine that retraction has been impeded. In some implementations, determining that the retraction is impeded may be performed by detecting high tension at the wire tension sensor. For example, when a wire tension sensor such as the sensor 338, 1308 of FIG. 3 or 13 outputs sensor data that represents a load that exceeds a defined threshold, the controller 2104 may determine that retraction has been impeded.

In at least some implementations, when the controller 2104 determines that retraction is impeded, it may cause the wire retractor to pause retraction. For example, retraction may be paused for a time period and then retraction may be initiated by the controller 2104 once again. In some implementations, in response to determining that the retraction is impeded, the controller 2104 may cause the wire retractor to extend the mechanical wire 102 by a defined amount. This may provide slack to the mechanical wire 102 which may aid in removing the snag or obstruction.

Figure 24:
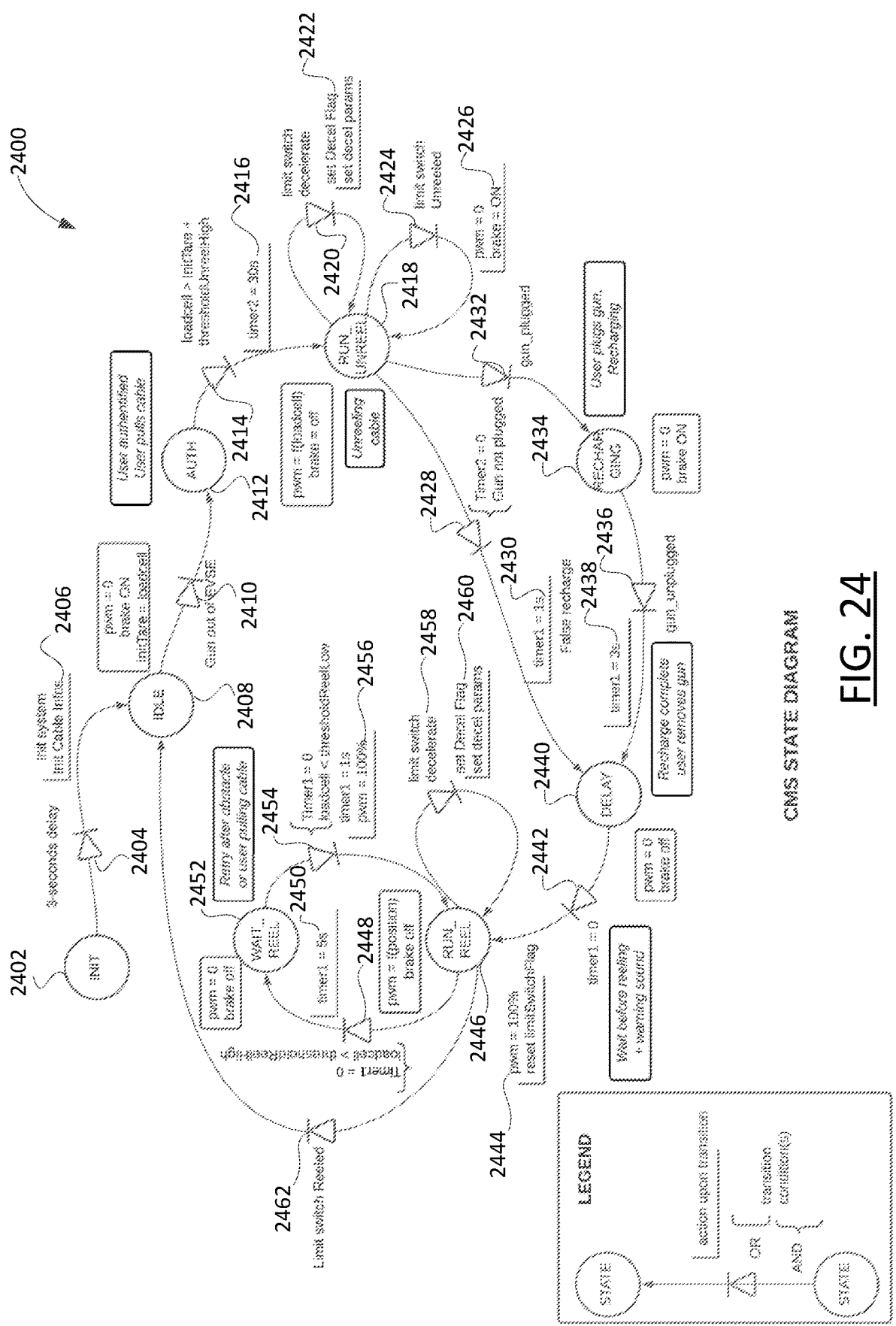
FIG. 24 is an example state diagram that may be performed by a controller associated with a cable management system in accordance with example embodiments of the present disclosure.

Reference will now be made to FIG. 24 which illustrates a state diagram 2400. The state diagram reflects operations and operating states of a cable management system 300, 1300, a wire retractor 800, 1314 and/or an EV charging station 100. More particularly, the operations may be performed by a controller 2104 associated with the cable management system 300, 1300, a wire retractor 800, 1314 and/or an EV charging station 100 and/or the operating states may be operating states of the controller 2104. For ease of reference and readability, the operations described below are described as being performed by the controller 2104, but it will be appreciated that the operations may be performed by one or more of the controller 2104, the cable management system 300, 1300, the wire retractor 800, 1314 and/or the EV charging station 100. Any reference to the controller 2104 below may be replaced with a reference to the cable management system 300, 1300, the wire retractor 800, 1314 and/or the EV charging station 100.

In at least some implementations, computer-executable instructions stored in memory may configure one or more of the controller 2104, the cable management system 300, 1300, the wire retractor 800, 1314 and/or the EV charging station 100 to perform the operations described below with reference to the state diagram 2400 and/or to initiate the operating states described below with reference to the state diagram 2400.

The operations and/or operating states illustrated in the state diagram 2400 may be included in a method. For example, such operations may be included in the method 2300 of FIG. 23. For example, one or more of the operations may be performed at the operation 2304 of the method 2300 of FIG. 23.

The state diagram 2400 may begin when the controller 2104 is powered on or reset. The controller 2104 may be placed in an initialization operating state operation 2402. The controller 2104, may then, at an operation 2404, implement a delay, such as a three second delay. This delay may ensure that all necessary components are fully powered on and ready.

After the delay, the controller 2104 may initialize the system at operation 2406. Initialization may include one or more operations including, for example, calibration operation and/or other operations that initialize various components of the system.

After initialization, the controller 2104 may be placed in an idle state at operation 2408. At this state, the motor may be disabled. For example, a speed associated with the motor may be set to zero so that the motor does not rotate. This may be done by setting the pulse width modulation (PWM) associated with the motor to zero. Additionally or alternatively, the motor may be placed in a locked state; for example, using a brake.

The controller 2104 may, at the operation 2408, initialize a sensor 338, 1308 or perform an initialization operation based on sensor data from the sensor 338, 1308. For example, the controller 2104 may determine a resting load or force measured at the sensor 308, 1308. That is, the controller 2104 may determine sensor data when no external load or force is being applied to the charging cable 150. Such sensor data may represent the force of gravity acting upon the charging cable 150. This operation may be referred to as a taring operation.

When the controller 2104 is operating in the idle state, the controller 2104 may monitor for one or more trigger conditions before initiating extension of the mechanical wire 102. For example, in one implementation, the controller 2104 may only allow extension of the mechanical wire 102 when a connector 160, 162 (FIG. 1) is determined to have been removed from a holster 180, 182 associated with the electric vehicle charger 120, 122. In some implementations, the controller 2104 may not monitor for a pull on the mechanical wire 102 until the connector 160, 162 has been removed from the holster 180, 182. The controller 2104 determines whether the connector 160, 162 has been removed from the holster 180, 182 based on charger state data received from an interface associated with the electric vehicle charger 120, 122. The controller 2104 may prevent the mechanical wire 102 from being extended or further extended until it determines that the connector 160 is has been removed from the holster 180, 182.

If the controller 2104 determines, at the operation 2410, that the connector 160, 162 is not plugged into the holster 180, 182 of the electric vehicle charger 120, 122, then it may proceed to an operation 2412. At the operation 2412, the controller 2104 waits for an operator and/or vehicle to be authenticated. For example, the controller 2104 may wait for charger state data from an interface of the EV charger which indicates that the operator and/or vehicle has been authenticated. In at least some operations, the controller 2104 may prevent the mechanical wire 102 from being extended or further extended until the operator and/or vehicle has been authenticated. Once the controller detects that the operator and/or vehicle has been authenticated, it may proceed to an operation 2414 at which it waits to detect a pull on the charger cable 150 that is sufficient to initiate extension of the mechanical wire 102. At the operation 2414, the controller 2104 may determine that an operator has pulled on the charger cable 150 when it detects sensor data from the sensor 338, 1308 that represents a sufficiently large load or force. The sufficiency of the load or force may be determined relative to a threshold (thresholdUnreelHigh) and, in at least some implementations relative to the resting load or force as determined at the operation 2408. For example, if the sensor data represents a load that is greater than sum of the resting load and the threshold load, then the controller 2104 may determine that a load that is sufficiently large to initiate extension of the mechanical wire 102 has been detected.

In at least some implementations, when it is determined that a sufficiently large load has been detected, the controller 2104 may initiate a timer at an operation 2416. In the illustrated example, the timer is a thirty (30) second count down timer but the timer may take other forms. The timer may be configured to allow an operator a defined period of time to plug the connector 160 of the charging cable 150 into an EV. If the charging cable is not connected to the port of the EV within the defined period of time, then the controller 2104 may determine that a false charge has occurred and may initiate retraction of the mechanical wire 102. The timer may be initiated at a different sequence than the sequence illustrated in the state diagram 2400. For example, it may be that the timer is only initiated when the mechanical wire is fully extended; for example, at an operation 2426 (described below) after the controller determines at an operation 2424 (also described below) that the mechanical wire 102 is fully extended.

In at least some implementations, when it is determined that a sufficiently large load has been detected, the controller 2104 may also, at an operation 2418, initiate extension of the mechanical wire 102. At the operation 2418, the rate at which the mechanical wire 102 is extended may depend upon the load sensed by the sensor. That is, the controller 2104 may configure the motor to operate at a rate that depends upon the load sensed at the operation 2414. A higher load causes faster extension of the mechanical wire 102 and a lower load causes a slower extension of the mechanical wire 102 (e.g., pwm=f(loadcell), where pwm is a pulse width modulation signal indicating the rate and f is a function that is applied to the sensor data reading). In at least some implementations, the function that is applied to the sensor data to determine the rate of extension may account for the resting load determined at the operation 2408. That is, the rate of extension may be determined from the sensor data obtained at the operation 2414 and also based on the sensor data obtained at the operation 2408 representing the resting load.

Extension of the mechanical wire 102 is initiated at the operation 2418 when the controller is operating in an extension state, which may also be referred to as a run unreel state.

At the operation 2418, the controller may also remove a lock associated with a wire retractor. This may include removing a brake and/or adjusting an operating state. When the lock is removed, the wire retractor may be permitted to operate.

In at least some implementations, the extension of the mechanical wire 102 may continue at a constant rate until a condition is detected. For example, in at least some implementations, at an operation 2420, the controller 2104 may monitor one or more extension state sensors such as one or more winding state sensors. For example, at the operation 2420, the controller 2104 may determine that a terminal position is approaching. Put differently, the controller 2104 may determine that a wire retractor is nearing or approaching a terminal position in which a mechanical wire 102 will be considered to be fully extended. The controller 2104 may determine that the wire retractor is nearing the terminal position based on sensor data from one or more intermediate position sensors 506. As noted above, such sensors may be positioned to detect when a guide 320 is at a position that is not at the terminal positions. Put differently, such sensors may be positioned to detect when the guide 320 is at an intermediate position, which may be a position between terminal positions. The controller 2104 may, upon detecting that the wire retractor is nearing or approaching the terminal position, adjust a rate of extension at an operation 2422. For example, the controller 2104 may control the motor to operate at a slower speed than its initial speed of operation when the operation 2418 was initiated.

Other detected conditions may affect the extension of the mechanical wire 102. For example, in at least some implementations, at an operation 2424, the controller 2104 may also monitor one or more extension state sensors such as one or more winding state sensors. For example, at the operation 2424, the controller 2104 may determine that a terminal position has been reached. Or, put differently, the controller 2104 may determine that the mechanical wire 102 is fully extended. That is, the controller 2104 may determine that the wire retractor is at a terminal position at which the mechanical wire 102 is fully extended. The controller 2104 may determine at the operation 2424 that the terminal position has been reached based on input from a terminal position sensor 504. The terminal position sensor 504 may be of a type described herein.

Upon detecting that the mechanical wire 102 is fully extended, the controller 2104 may perform an operation 2426 at which the controller 2104 controls the wire retractor and/or the motor to prevent any further extension of the mechanical wire 102. For example, the controller 210 may apply a lock, such as a brake and/or it may set a speed of extension to zero so that extension stops.

In at least some implementations, after the mechanical wire 102 has been extended at the operation 2418, the controller 2104 may detect one or more conditions which cause other operations to be performed. For example, the controller 2104 may, at an operation 2428, determine that the timer initiated at the operation 2416 has expired before the charging cable 150 was connected to an electric vehicle by connecting the connector 160 to the port of the electric vehicle. Put differently, at the operation 2428, the controller 2104 may determine that a false charge has occurred. In response, the controller 2104 may initiate retraction of the mechanical wire at an operation 2446. The operation 2446 may be performed after a delay. For example, the controller 2104 may initiate a timer at an operation 2430 and may enable a delay state at an operation 2440. The lock may be released at the operation 2440 but the speed of the wire retractor may remain at no speed (i.e., zero). At an operation 2442, the controller 2104 may detect that the timer has expired and it may initiate retraction of the mechanical wire. Retraction may be performed by configuring the wire retractor to operate at a non-zero speed at an operation 2444. The wire retractor may be configured to operate in a reverse direction to the direction of operation during the extension at the operation 2418. In at least some implementations, the wire retractor may be configured to operate at a maximum speed at the operation 2444. In at least some implementations, at the operation 2444, the controller may also reset one or more limit switch flags which may have been set at the operations 2420 and/or 2424.

The controller 2104 may proceed from the operation 2444 to the operation 2446 in which the controller 2104 is operating in a retracting state so that the mechanical wire 102 is retracted.

In some instances, the charging cable 150 may be connected to an electric vehicle before the timeout occurs (at the operation 2428). For example, it may be that the controller 2104 determines, at an operation 2432, that the connector 160 has been plugged into a port associated with the electric vehicle. The controller 2104 may determine that the charging cable 150 has been connected to the electric vehicle based on charger state data received from the electric vehicle.

In at least some implementations, the controller may, after the charging cable has been connected to the EV, initiate a recharging state operation 2434. In some implementations, the recharging state operation 2434 may be initiated based on charger state data indicating that the charging cable has been connected and, in some implementations, the recharging state operation 2434 may be initiated in response to charger state data being received by the controller 2104 that indicates that the electric vehicle is currently being charged. At the operation 2434, the controller 2104 may turn on or leave on a lock associated with the wire retractor so that the wire retractor does not move the mechanical wire. The controller 2104 may, additionally or alternatively, set a rate of retraction/extension for the wire retractor to zero so that no retraction or extension of the mechanical wire is possible.

In at least some implementations, the controller 2104 may, after the operation 2434, monitor to determine when the charging cable is removed from the electric vehicle. For example, at an operation 2436, the controller 2104 may detect, based on charger state data received from an interface of the EV charger that the charging cable has been disconnected from the electric vehicle. That is, it may determine that a connector 160 associated with the charging cable 150 has been removed from a port of the electric vehicle.

In response to detecting that the charging cable 150 has been disconnected from the EV, the controller 2104 may initiate retraction of the mechanical wire at an operation 2446. The operation 2446 may be performed after a delay. For example, the controller 2104 may initiate a timer at an operation 2438 and may enable a delay state at an operation 2440. The lock may be released at the operation 2440 but the speed of the wire retractor may remain at no speed (i.e., zero). At an operation 2442, the controller 2104 may detect that the timer has expired and it may initiate retraction of the mechanical wire. Retraction may be performed by configuring the wire retractor to operate at a non-zero speed at an operation 2444. The wire retractor may be configured to operate in a reverse direction to the direction of operation during the extension at the operation 2418. In at least some implementations, the wire retractor may be configured to operate at a maximum speed at the operation 2444. In at least some implementations, at the operation 2444, the controller may also reset one or more limit switch flags which may have been set at the operations 2420 and/or 2424.

The controller 2104 may proceed from the operation 2444 to the operation 2446 in which the controller 2104 is operating in a retracting state so that the mechanical wire 102 is retracted.

At the operation 2446, the controller may cause the wire retractor to retract the mechanical wire. A lock may be removed at the operation 2446 if it hasn't been removed already. For example, a brake may be disabled. In at least some implementations, the retraction of the mechanical wire 102 may continue until one or more conditions are detected by the controller 2104. For example, in some implementations, the controller 2104 may, during retraction, monitor to determine whether retraction of the charging cable 150 is impeded (at an operation 2448) and/or whether the mechanical wire 102 has been fully retracted (at an operation 2462) or whether the mechanical wire 102 is almost fully retracted (at an operation 2458).

At an operation 2448, the controller 2104 may determine that the retraction of the mechanical is impeded. This may include determining that the mechanical wire 102 appears to be caught, snagged or obstructed. The controller 2104 may determine that retraction has been impeded using a variety of techniques. For example, in some implementations, determining that the retraction is impeded may be performed by detecting a motor overload on a motor associated with the wire retractor. That is, when the motor is overloaded, the controller 2104 may determine that retraction has been impeded. In some implementations, determining that the retraction is impeded may be performed by detecting high tension at the wire tension sensor. For example, when a wire tension sensor such as the sensor 338, 1308 of FIG. 3 or 13 outputs sensor data that represents a load that exceeds a defined threshold, the controller 2104 may determine that retraction has been impeded.

In at least some implementations, when the controller 2104 determines that retraction is impeded, it may cause the wire retractor to pause retraction. For example, retraction may be paused for a time period (configured at an operation 2450). The pause or delay may be implemented at an operation 2452 at which a speed or rate of the wire retractor is set to zero. The lock, such as the brake, may be left in a disabled state.

After expiration of the time period (which may be determined to be expired at operation 2456), the controller 2104 may initiate retraction again. In at least some implementations, the controller 2104 only initiates retraction if the sensor data from a sensor 338, 1308 indicates that the mechanical wire 102 no longer appears to be caught, snagged or obstructed. For example, the controller may determine (at an operation 2454) whether the sensor data indicates a load that is less than a threshold. If so, then the controller 2104 may initiate retraction of the mechanical wire 102.

Other conditions may be detected in order to affect the retraction operation 2446. For example, in at least some implementations, at an operation 2458, the controller 2104 may monitor one or more retraction state sensors such as one or more winding state sensors. For example, at the operation 2458, the controller 2104 may determine that a terminal position is approaching. Put differently, the controller 2104 may determine that a wire retractor is nearing a terminal position in which a mechanical wire 102 will be considered to be fully retracted. The controller 2104 may determine that the wire retractor is nearing or approaching the terminal position based on sensor data from one or more intermediate position sensors 506. As noted above, such sensors may be positioned to detect when a guide 320 is at a position that is not at the terminal positions. Put differently, such sensors may be positioned to detect when the guide 320 is at an intermediate position, which may be a position between terminal positions. The controller 2104 may, upon detecting that the wire retractor is nearing or approaching the terminal position, adjust a rate of extension at an operation 2460. For example, the controller 2104 may control the motor to operate at a slower speed than its initial speed of operation when the operation 2446 was initiated.

The controller 2104 may be configured to stop retraction of the mechanical wire by resuming the idle state at the operation 2408 in response to detecting that the mechanical wire 102 is fully retracted. For example, in at least some implementations, at an operation 2462, the controller 2104 may also monitor one or more extension state sensors such as one or more winding state sensors. For example, at the operation 2462, the controller 2104 may determine that a terminal position has been reached. Or, put differently, the controller 2104 may determine that the mechanical wire 102 is fully retracted. That is, the controller 2104 may determine that the wire retractor is at a terminal position at which the mechanical wire 102 is fully retracted. The controller 2104 may determine at the operation 2462 that the terminal position has been reached based on input from a terminal position sensor 502. The terminal position sensor 502 may be of a type described herein.

When the controller 2104 determines that the mechanical wire 102 has been fully extended, it may resume the operation 2408. In doing so, it may stop any further retraction of the mechanical wire by controlling the wire retractor to set a speed associated with the wire retractor to zero and/or by engaging a lock, such as a brake associated with the motor. Additionally or alternatively, a new resting force or load may be determined. The method or process may then continue such that one or more operations may be re-performed; for example, when a further operator pulls the charging cable.

The mechanical wire 102 may, in at least some implementations, have a length that varies based on a number of factors such as, for example, the weather, an amount of force or load being exerted upon it, or based on other factors. Due to such variability, in some implementations, a terminal position sensor may be arranged to detect a position of a terminal end of the mechanical wire 102. The terminal end of the mechanical wire is the distal end of the mechanical wire 102. That is, the terminal end of the mechanical wire 102 may be the end that connects the wire to the charging cable 150. For example, the terminal end of the mechanical wire may be an end that connects to a coupler 170 that connects the mechanical wire 102 to the charging cable.

In some implementations, the terminal position sensor may sense a location of the coupler 170. For example, the coupler may be configured with one or more sensing features that allow a terminal position sensor to sense a position of the coupler 170. That is, the sensing features may allow a terminal position sensor to sense a position of a terminal end of the mechanical wire 102. For example, the sensing features may allow a terminal position sensor to sense whether the coupler 107 and/or terminal end of the mechanical wire 102 is in a position associated with full retraction of the mechanical wire 102.

Figure 25:
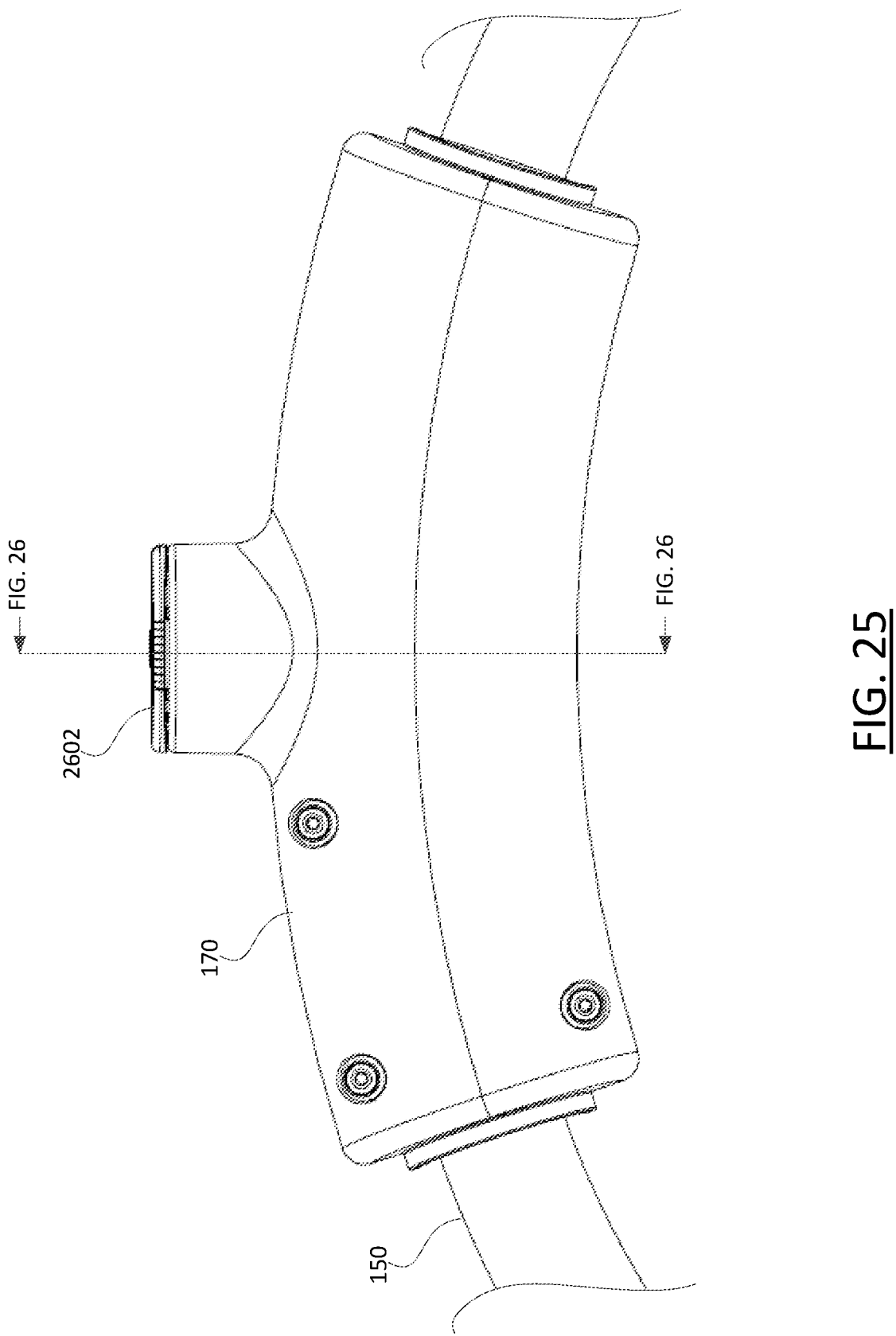
FIG. 25 is a front elevational view of a coupler for connecting a mechanical wire to a charging cable in accordance with example embodiments of the present disclosure.
Figure 26:
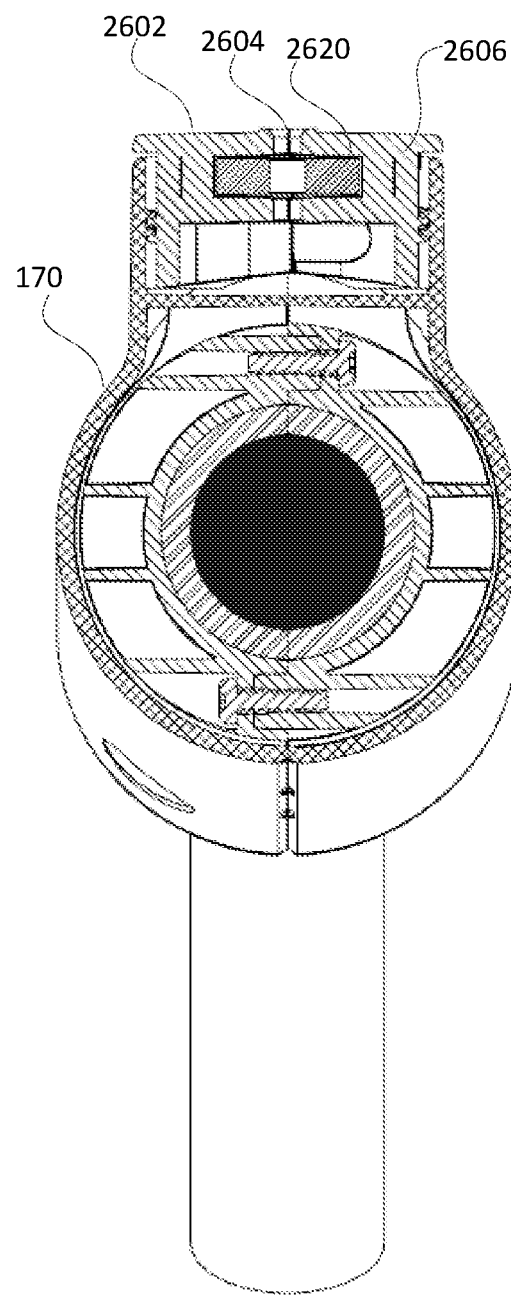
FIG. 26 is a cross sectional view of the coupler of FIG. 25 taken along the line marked FIG. 26-FIG. 26 of FIG. 25
Figure 27:
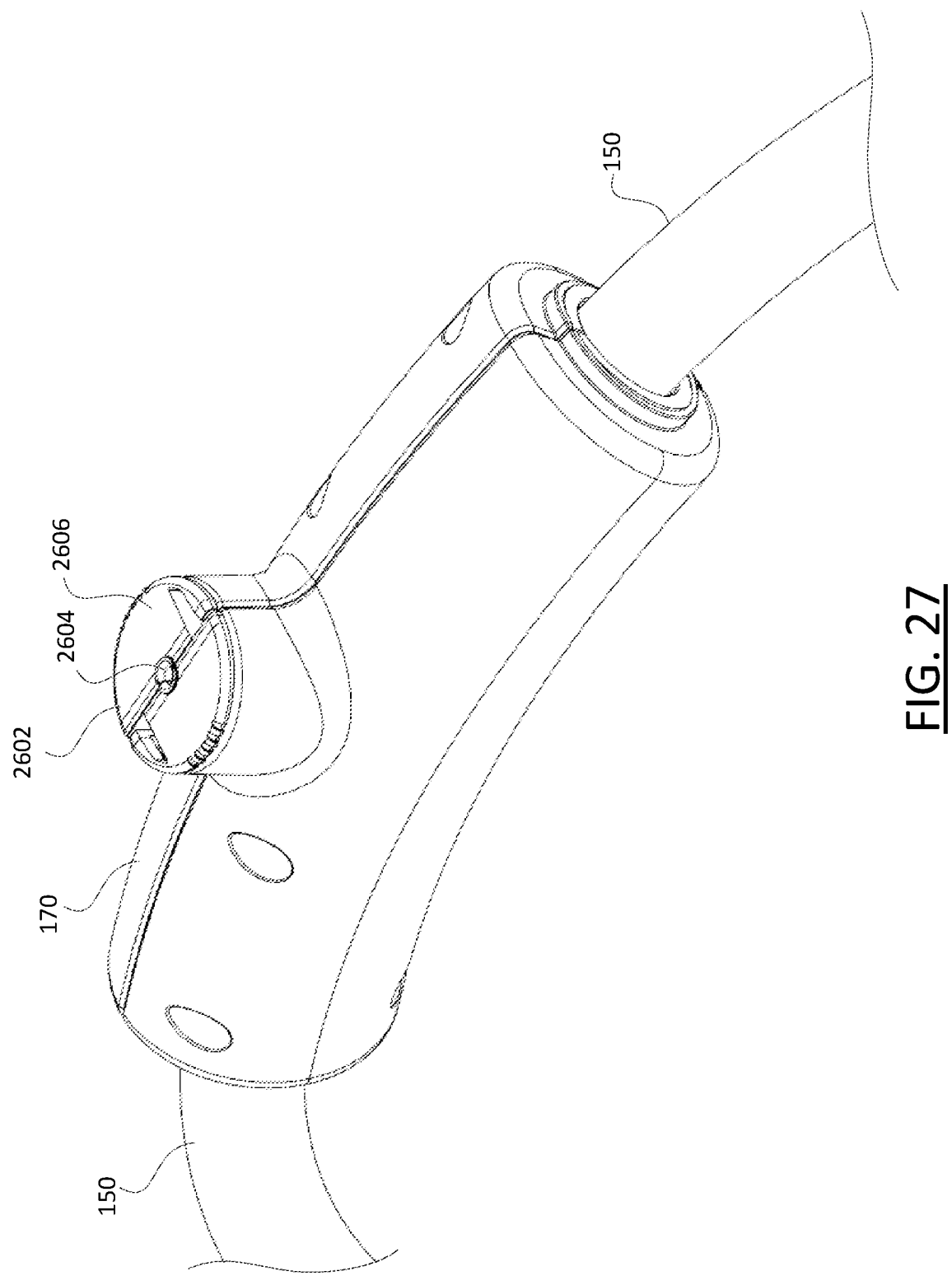
FIG. 27 is a right side top perspective view of the coupler of FIG. 25 in accordance with example embodiments of the present disclosure.
Figure 28:
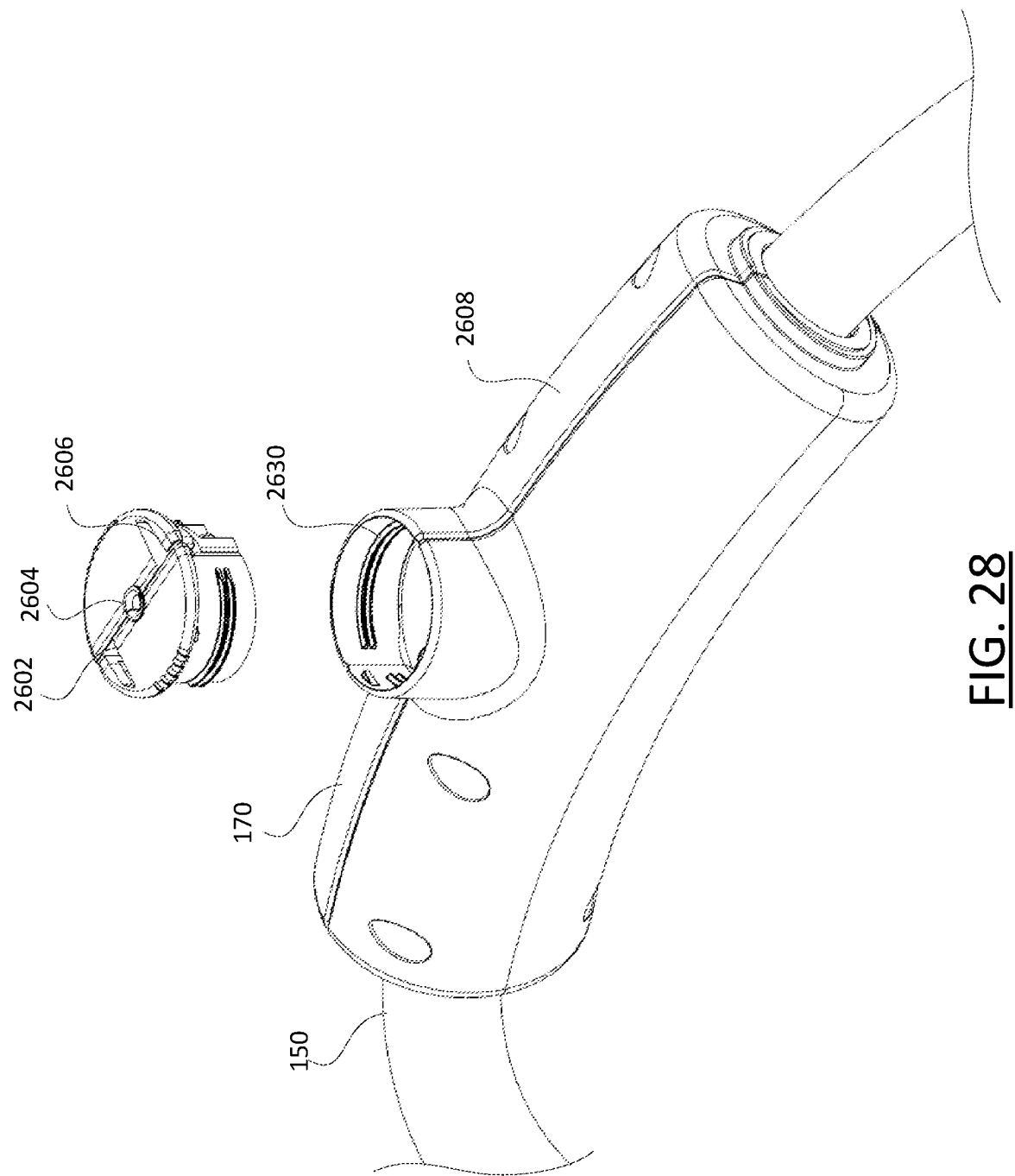
FIG. 28 is a right side top exploded view of the coupler of FIG. 25 in accordance with example embodiments of the present disclosure.

An example of a coupler 170 equipped with such a sensing feature will now be described with reference to FIGS. 25 to 28. FIG. 25 illustrates a front elevational view of a coupler 170 that is attached to a cable 150. FIG. 26 is a sectional view of the coupler 170 taken along the line marked FIG. 26-FIG. 26 in FIG. 25. FIG. 27 is a perspective view of the coupler 170 and FIG. 28 is an exploded perspective view of the coupler 170.

In the illustrated example, the coupler 170 is not yet attached to a mechanical wire 102, but the connector may be attached to a mechanical wire at or near a top side 2602 of the coupler 170. For example, the coupler may include a wire receiver 2604 at the top side 2602. The wire receiver 2604 may be a hole defined in a portion of the coupler 170. For example, in the illustrated example, the coupler 170 is a two part coupler including a first part 2606 and a second part 2608. The first part 2606 is, as illustrated in FIG. 28, removable from the second part 2608. For example, the first part 2606 may mate with the second part 2608 through a threaded connection and the first part 2606 may be rotated in one direction relative to the second part 2608 in order to connect the first part 2606 to the second part and it may be rotated in a second direction relative to the second part 2608 in order to disconnect the first part 2606 from the second part 2608. The parts may be disconnected in order to, for example, fasten the mechanical wire 102 to the coupler 170 in the field. For example, the mechanical wire may be placed through the wire receiver 2604 and it may be tied off or attached to a coupler such as a clamp including, for example, a wire clamp. In this way, the mechanical wire 102 may be attached to the coupler 170 through attachment to the first part 2606.

As illustrated in FIG. 26, the coupler 170 may include a sensing feature such as a magnet 2620. The sensing feature may be provided at or near the top side 2602. For example, the magnet 2620 may be placed within the first part 2606. In the illustrated example, the magnet is a ring magnet that defines a hole through which the mechanical wire 102 may pass.

The magnet 2620 may be sensed by a sensor, such as a terminal position sensor that is situated to detect the magnet 2620 when the mechanical wire 102 is fully retracted. For example, the terminal position sensor may be situated to detect when the coupler 170 is near the enclosure 110. In at least some implementations, the terminal position sensor may be a magnetic sensor which senses the magnet 2620. The terminal position sensor may, in at least some implementations, be situated at or near an outlet port of an enclosure 110. The outlet port serves to pass the mechanical wire 102 from inside the enclosure 110 to outside of the enclosure 110.

Sensor data from the terminal position sensor may be used in the methods and operations described above. For example, a terminal position sensor that relies upon sensing a magnet located at a terminal end of the mechanical wire 102 may be used for sensing full retraction of the mechanical wire in any of the methods or operations described above that relate to sensing full retraction. By way of example, such sensor data may be used in the operation 2304 of the method 2300 of FIG. 23 and/or the operation 2462 of the state diagram 2400 of FIG. 24.

As noted, certain adaptations and modifications of the described embodiments can be made. Therefore, the above discussed embodiments are considered to be illustrative and not restrictive.

What is claimed is:

1. A cable management system for an electric vehicle charger, the cable management system comprising: a mechanical wire coupled to a charging cable associated with the electric vehicle charger; an enclosure; a wire tension sensor engaging the mechanical wire, the wire tension sensor generating a sensor output based on a force applied to the mechanical wire; a wire retractor configured to retract the mechanical wire into the enclosure and extend the mechanical wire from the enclosure; a controller coupled to the wire tension sensor, the controller configured with instructions which, when executed, cause the controller to control the wire retractor based on an amount of force applied to the mechanical wire; and wherein the instructions cause the controller to: obtain sensor data from the wire tension sensor, and wherein controlling the wire retractor based on an amount of force applied to the mechanical wire includes: comparing the sensor data to a threshold; and sending a control signal to the wire retractor based on a result of the comparison.

2. The cable management system of claim 1, wherein the instructions cause the wire retractor to extend the mechanical wire in response to detecting a pulling force applied to the mechanical wire.

3. The cable management system of claim 2, wherein the instructions cause the wire retractor to extend the mechanical wire in response to detecting a load that is determined to be at least a threshold amount greater than a resting state load determined after a last full retraction of the mechanical wire.

4. The cable management system of claim 1, wherein the instructions cause the wire retractor to extend the mechanical wire at a rate that depends on an amount of the force applied to the mechanical wire.

5. The cable management system of claim 1, wherein the instructions cause the wire retractor to extend the mechanical wire at a first rate when a first amount of force is applied to the mechanical wire and at a different second rate when a second amount of force is applied to the mechanical wire, the second amount of force being different than the first amount of force.

6. The cable management system of claim 1, wherein the instructions cause the controller to send the control signal to extend the mechanical wire at a first speed when a load represented by the sensor data exceeds a first threshold.

7. The cable management system of claim 6, wherein the instructions cause the controller to send the control signal to extend the mechanical wire at a second speed when a load represented by the sensor data exceeds a second threshold.

8. The cable management system of claim 1, further comprising an extension state sensor coupled to the controller and wherein the instructions further cause the controller to:
  detect, based on sensor data from an extension state sensor, that the wire retractor is in a particular state of extension; and
  in response to detecting that the wire retractor is in the particular state of extension, reducing a speed of the wire retractor to slow extension of the mechanical wire.

9. The cable management system of claim 1, further comprising a retraction state sensor coupled to the controller and wherein the instructions further cause the controller to:
  detect, based on sensor data from a retraction state sensor, that the wire retractor is in a particular state of retraction; and
  in response to detecting that the wire retractor is in the particular state of extension, reducing a speed of the wire retractor to slow retraction of the mechanical wire.

10. The cable management system of claim 1, wherein the controller is coupled to an interface of an electric vehicle charger and wherein the controller is configured to:
  receive charger state data; and
  control the wire retractor based on the charger state data.

11. The cable management system of claim 10, wherein controlling the wire retractor based on the charger state data includes preventing extension of the mechanical wire by the wire retractor unless the charger state data indicates an authorized state indicating that an operator has been authorized to use the electric vehicle charger.

12. The cable management system of claim 10, wherein controlling the wire retractor based on the charger state data includes controlling the wire retractor to stop extension of the mechanical wire when the charger state data indicates that a connector associated with the electric vehicle charger has been connected to a charging port of an electric vehicle.

13. The cable management system of claim 12, wherein the instructions further configure the controller to lock the wire retractor in response to detecting that the charger state data indicates that a connector associated with the electric vehicle charger has been connected to a charging port of an electric vehicle.

14. The cable management system of claim 10, wherein controlling the wire retractor based on the charger state data includes controlling the wire retractor to initiate retraction of the mechanical wire when the charger state data indicates that a connector associated with the electric vehicle charger has been disconnected from a charging port of an electric vehicle.

15. The cable management system of claim 1, further comprising a terminal position sensor coupled to the controller and wherein the instructions further cause the controller to:
   detect, based on sensor data from the terminal position sensor that the mechanical wire is fully extended; and
   in response to detecting that the wire retractor is fully extended, stopping extension of the mechanical wire.

16. The cable management system of claim 1, further comprising a terminal position sensor coupled to the controller and wherein the instructions further cause the controller to:
   detect, based on sensor data from the terminal position sensor that the mechanical wire is fully retracted; and
   in response to detecting that the wire retractor is fully retracted, stopping retraction of the mechanical wire.

17. The cable management system of claim 1, wherein the instructions cause the controller to:
   determine that retraction is impeded; and
   in response to determining that the retraction is impeded, cause the wire retractor to pause retraction.

18. The cable management system of claim 17, wherein determining that the retraction is impeded is performed by detecting a motor overload on a motor associated with the wire retractor.

19. The cable management system of claim 17, wherein determining that the retraction is impeded is performed by detecting high tension at the wire tension sensor.

20. The cable management system of claim 1, wherein the instructions cause the controller to:
   determine that retraction is impeded; and
   in response to determining that the retraction is impeded, cause the wire retractor to extend the mechanical wire to provide slack to the mechanical wire.

* * * * *